(12) United States Patent
Kasher et al.

(10) Patent No.: US 10,560,917 B2
(45) Date of Patent: Feb. 11, 2020

(54) ANGLE OF DEPARTURE FOR LOCATION DETERMINATION

(71) Applicant: QUALCOMM Incorporated, San Diego, CA (US)

(72) Inventors: Assaf Yaakov Kasher, Haifa (IL); Amichai Sanderovich, Atlit (IL); Alecsander Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/693,391

(22) Filed: Aug. 31, 2017

(65) Prior Publication Data

US 2018/0317197 A1 Nov. 1, 2018

Related U.S. Application Data

(60) Provisional application No. 62/491,190, filed on Apr. 27, 2017.

(51) Int. Cl.
*H04W 64/00* (2009.01)
*H04W 72/04* (2009.01)
(Continued)

(52) U.S. Cl.
CPC ............ *H04W 64/006* (2013.01); *G01S 5/12* (2013.01); *H04W 4/02* (2013.01); *H04W 72/048* (2013.01); *H04L 27/2611* (2013.01)

(58) Field of Classification Search
CPC ..... G01S 3/66; G01S 5/08; G01S 5/10; G01S 5/12; H04L 27/2611; H04W 16/28;
(Continued)

(56) References Cited

U.S. PATENT DOCUMENTS

2013/0188538 A1* 7/2013 Kainulainen ............. G01S 3/48
370/310
2014/0004877 A1* 1/2014 Van Diggelen ........... G01S 5/12
455/456.1
(Continued)

OTHER PUBLICATIONS

Eitan A., et al., Additional Requirements for 11 ay for Supporting 60GHz High Resolution Location; 11-16-1511-00-00az-additional-requirements—for-11ay-for-supporting-60ghz-high-resolution-location, IEEE-SA Mentor, Piscataway, NJ USA, Nov. 9, 2016, vol. 802. 11az, XP068110954, Retrieved from the Internet: URL:https://mentor.ieee.org/802.11/dcn/16/11-16-1511-00-00az-additional-requirements-for-11ay-for-suppor . . . [retrieved on Nov. 9, 2016], pp. 1-8.
(Continued)

*Primary Examiner* — Babar Sarwar
(74) *Attorney, Agent, or Firm* — Steven R. Thiel; Arent Fox LLP

(57) ABSTRACT

In an aspect of the disclosure, a method, a computer-readable medium, and an apparatus are provided. The apparatus may include a processing system configured to generate a frame including a data field and a plurality of training subfields. The data field may include information indicating a different direction for transmitting each of the training subfields. The apparatus may include an interface configured to output the frame for transmission with the data field in a first direction and the training subfields in their respective directions.

20 Claims, 13 Drawing Sheets

(51) Int. Cl.
*G01S 5/12* (2006.01)
*H04W 4/02* (2018.01)
*H04L 27/26* (2006.01)

(58) Field of Classification Search
CPC ..... H04W 4/02; H04W 64/00; H04W 64/006; H04W 72/048; H04W 84/12
See application file for complete search history.

(56) References Cited

U.S. PATENT DOCUMENTS

| | | | | |
|---|---|---|---|---|
| 2014/0073352 | A1* | 3/2014 | Aldana | G01S 13/876 455/456.1 |
| 2014/0335891 | A1* | 11/2014 | Zhang | H04W 64/003 455/456.1 |
| 2015/0230263 | A1 | 8/2015 | Roy et al. | |
| 2016/0100287 | A1* | 4/2016 | Thornycroft | H04W 40/244 455/456.1 |
| 2016/0202344 | A1* | 7/2016 | Sanderovich | G01S 5/06 455/456.1 |
| 2016/0366548 | A1* | 12/2016 | Wang | H04W 64/00 |
| 2017/0207839 | A1* | 7/2017 | Eitan | H04B 7/0617 |
| 2018/0054245 | A1* | 2/2018 | Trainin | H04W 16/28 |
| 2018/0317197 | A1* | 11/2018 | Kasher | H04W 64/006 |

OTHER PUBLICATIONS

International Search Report and Written Opinion—PCT/US2018/028106—ISA/EPO—dated Jul. 4, 2018.
Kasher A., et al., (Qualcomm): 60GHz-Passive-Location; IEEE Draft; 11-18-0220-00-00AZ-60GHZ-Passive-Location, IEEE-SA Mentor, Piscataway, NJ USA, vol. 802.11az, Jan. 16, 2018, XP068123012, Retrieved from the Internet: URL:https://mentor.ieee.org/802.11/dcn/18/11-18-0220-00-00az-60ghz-passive-location.pptx [retrieved on Jan. 16, 2018], pp. 1-11.
Silva C.D., et al., (INTEL): "Draft Text for BRP Transmit Sector Sweep", IEEE Draft; 11-17-0323-02-00AY-Draft-Text-For-BRP-Transmit-Sector-Sweep, IEEE-SA Mentor, Piscataway, NJ USA, Mar. 14, 2017, vol. 802.11ay, No. 2, XP068115347, Retrieved from the Internet: URL:https://mentor.ieee.org/802.11/dcn/17/11-17-0323-02-00ay-draft-text-for-brp-transmit-sector-sweep.do . . . [retrieved on Mar. 14, 2017], pp. 1-7.
Silva C.D., et al.,(INTEL): "BRP Transmit Sector Sweep", IEEE Draft; 11-17-0322-01-00AY-BRP-Transmit-Sector-Sweep, IEEE-SA, Mentor, Piscataway, NJ, USA, vol. 802.11ay, No. 1, Mar. 14, 2017, XP068115344, Retrieved from the Internet: URL: https://mentor.ieee.org/802.11/dcn/17/11-17-0322-01-00ay-brp-transmit-sector-sweep.pptx [retrieved on Mar. 14, 2017]), pp. 1-15.
Tsang Y.M., et al., "Coding the Beams: Improving Beamforming Training in mmWave Communication System", 2011 IEEE Global Telecommunications Conference, GLOBECOM 2011, Aug. 1, 2012, XP055486063, DOI:10.1109/GLOCOM.2011.6134486, ISBN: 978-1-4244-9267-1, pp. 1-6.
Wang J., (MEDIATEK): "Clause 3_2_5 Scalable Beamforming Training; 11-16-1628-00-00ay-clause-3-2-5-scalable-beamforming-training", IEEE Draft; 11-16-1628-00-00ay-clause-3-2-5-scalable-beamforming-training, IEEE-SA Mentor, Piscataway, NJ USA, Dec. 21, 2016, vol. 802. 11ay, XP068112364, Retrieved from the Internet: URL:https://mentor.ieee.org/802.11/dcn/16/11-16-1628-00-00ay-clause-3-2-5-scalable-beamfonming-training . . . [retrieved on Dec. 21, 2016], pp. 1-3.

* cited by examiner

ANGLE OF DEPARTURE FOR LOCATION DETERMINATION

CROSS-REFERENCE TO RELATED APPLICATION(S)

This application claims the benefit of U.S. Provisional Application Ser. No. 62/491,190, entitled "PASSIVE POSITIONING USING DIRECTIONAL TRANSMISSIONS" and filed on Apr. 27, 2017, which is expressly incorporated by reference herein in its entirety.

BACKGROUND

Field

The present disclosure relates generally to communication systems, and more particularly, to a wireless node that uses an angle of departure for estimation of a position.

Background

Communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As communication networks become increasingly populated by wireless nodes, more efficient approaches for determination or estimation of location or position information may be needed. The disclosure below describes methods for more efficiently determining or estimating a location or position of a wireless apparatus using at least one angle of departure (AOD) associated with a remote apparatus.

In an aspect of the disclosure, an apparatus for wireless communication is provided. The apparatus may include a processing system configured to generate a frame including a data field and a plurality of training subfields, wherein the data field includes information indicating a different direction for transmitting each of the training subfields. The apparatus may include an interface configured to output the frame for transmission with the data field in a first direction and the training subfields in their respective different directions. In an aspect, the information indicates a respective angular offset relative to the first direction for each of the training subfields. In an aspect, the information indicates a respective direction vector for each of the training subfields, each direction vector indicating an azimuthal angle and an elevation angle. In an aspect, the interface is further configured to output the frame for transmission with the data field to be transmitting using a first beam width and each of the training subfields to be transmitting using a beam width equal to or less than the first beam width. In an aspect, the interface is further configured to obtain, from a remote apparatus, at least one amplitude measurement and at least one phase measurement associated with at least one of the training subfields, the processing system is further configured to determine a second direction associated with the remote apparatus based on the at least one phase measurement and the at least one amplitude measurement and to generate a second frame that includes the second direction, and the interface is configured to output the second frame for transmission. In an aspect, the processing system is further configured to determine the second direction by: generating a steering vector based on the at least one phase measurement and the at least one amplitude measurement, and the information that the preamble and data part of the packet were transmitted in a specific direction; comparing the generated steering vector to one or more stored steering vectors; and identifying, based on the comparison, the second direction associated with the remote apparatus. In an aspect, the processing system is configured to determine the second direction further based on the first direction. In an aspect, the processing system is further configured to include, in the data field, information indicating a location of the apparatus.

In another aspect of the disclosure, a method for wireless communication by an apparatus is provided. The method includes generating a frame including a data field and a plurality of training subfields, wherein the data field includes information indicating a different direction for transmitting each of the training subfields. The method includes outputting the frame for transmission with the data field in a first direction and the training subfields in their respective different directions. In an aspect, the information indicates a respective angular offset relative to the first direction for each of the training subfields. In an aspect, the information indicates a respective direction vector for each of the training subfields, each direction vector indicating an azimuthal angle and an elevation angle. In an aspect, the outputting the frame includes: outputting the frame for transmission with the data field to be transmitting using a first beam width and each of the training subfields to be transmitting using a beam width equal to or less than the first beam width. In an aspect, the method includes obtaining, from a remote apparatus, at least one amplitude measurement and at least one phase measurement associated with at least one of the training subfields, determining a second direction associated with the remote apparatus based on the at least one phase measurement and the at least one amplitude measurement and the and the information that the preamble and data part of the packet were transmitted in a specific direction, generating a second frame that includes the second direction, and outputting the second frame for transmission. In an aspect, the determining the second direction includes: generating a steering vector based on the at least one phase measurement and the at least one amplitude measurement; comparing the generated steering vector to one or more stored steering vectors; and identifying, based on the comparison, the second direction associated with the remote apparatus. In an aspect, the determining the second direction is further based on the first direction. In an aspect, the data field further includes information indicating a location of the apparatus.

In another aspect of the disclosure, an apparatus for wireless communication is provided. The apparatus includes means for generating a frame including a data field and a plurality of training subfields, wherein the data field includes information indicating a different direction for transmitting each of the training subfields. The apparatus includes means for outputting the frame for transmission with the data field in a first direction and the training subfields in their respective different directions. In an aspect, the information indicates a respective angular offset relative to the first direction for each of the training subfields. In an aspect, the information indicates a respective direction vector for each of the training subfields, each direction vector indicating an azimuthal angle and an elevation angle. In an aspect, the means for outputting the frame is configured to output the frame for transmission with the data field to be transmitting using a first beam width and each of the training subfields to be transmitting using a beam width equal to or less than the first beam width. In an aspect, the apparatus further includes means for obtaining, from a remote apparatus, at least one amplitude measurement and at least one phase measurement associated with at least one of the training subfields, means for determining a second direction associated with the remote apparatus based on the at least one phase measurement and the at least one amplitude measurement, means for generating a second frame that includes the second direction, and means for outputting the second frame for transmission. In an aspect, the means for determining the second direction is configured for: generating a steering vector based on the at least one phase measurement and the at least one amplitude measurement; comparing the generated steering vector to one or more stored steering vectors; and identifying, based on the comparison, the second direction associated with the remote apparatus. In an aspect, the means for determining the second direction is configured to determine the second direction further based on the second direction. In an aspect, the data field further includes information indicating a location of the apparatus.

In another aspect of the disclosure, a computer-readable medium comprising codes for wireless communication is provided. The computer-readable medium includes codes for wireless communication executable to cause an apparatus to generate a frame including a data field and a plurality of training subfields, wherein the data field includes information indicating a different direction for transmitting each of the training subfields. The computer-readable medium includes code to output the frame for transmission with the data field in a first direction and the training subfields in their respective different directions.

In another aspect of the disclosure, a wireless node is provided. The wireless node includes a receiver configured to receive, from a remote apparatus, a frame including a data field and a plurality of training subfields, wherein the data field includes information indicating a different transmission direction of each of the training subfields. The wireless node includes a processing system configured to determine a position of the wireless node based on the data field and the plurality of training subfields.

In another aspect, an apparatus for wireless communication is provided. The apparatus may include an interface configured to obtain, from a remote apparatus, a frame including a data field and a plurality of training subfields, wherein the data field includes information indicating a different transmission direction of each of the training subfields. The apparatus may include a processing system configured to determine a position of the apparatus based on the data field and the plurality of training subfields. In an aspect, the information indicates, for each of the training subfields, a respective angular offset relative to a first transmission direction associated with the data field. In an aspect, the information indicates a respective direction vector for each of the training subfields, each direction vector indicating an azimuthal angle and an elevation angle. In an aspect, the interface is further configured to obtain a location of the remote apparatus, and the processing system is further configured to determine the position of the apparatus further based on the location of the remote apparatus. In an aspect, the frame further indicates the location of the remote apparatus. In an aspect, the processing system is configured to determine the position of the apparatus based on a first line corresponding to at least one transmission direction of at least one training subfield, and another transmission direction of at least one other training subfield. In an aspect, the at least one other training subfield is included in another frame obtained from a second remote apparatus. In an aspect, the processing system is further configured to determine a phase measurement and an amplitude measurement associated with at least one training subfield, the interface is configured to: output, for transmission to the remote apparatus, a frame that includes the phase measurement and the amplitude measurement, and obtain, based on the frame that includes the phase measurement and the amplitude measurement, information indicating a second direction, and the processing system is further configured to determine the position based on the second direction. In an aspect, the processing system is configured to determine a phase measurement and an amplitude measurement associated with at least one training subfield, and determine the position of the apparatus based on the phase measurement and the amplitude measurement. In an aspect, the processing system is configured to determine the position further based on the first direction.

In another aspect of the disclosure, a method for wireless communication by an apparatus is provided. The method includes obtaining, from a remote apparatus, a frame including a data field and a plurality of training subfields, wherein the data field includes information indicating a different transmission direction of each of the training subfields. The method includes determining a position of the apparatus based on the data field and the plurality of training subfields. In an aspect, the information indicates, for each of the training subfields, a respective angular offset relative to a first transmission direction associated with the data field. In an aspect, the information indicates a respective direction vector for each of the training subfields, each direction vector indicating an azimuthal angle and an elevation angle. In an aspect, the method further includes obtaining a location of the remote apparatus, wherein the determining the position of the apparatus is further based on the location of the remote apparatus. In an aspect, the frame further indicates the location of the remote apparatus. In an aspect, the determining the position of the apparatus is based on at least one transmission direction of at least one training subfield, and another transmission direction of at least one other training subfield. In an aspect, the at least one other training subfield is included in another frame obtained from a second remote apparatus. In an aspect, the method further includes determining a phase measurement and an amplitude measurement associated with at least one training subfield; outputting, for transmission to the remote apparatus, a frame that includes the phase measurement and the amplitude measurement; and obtaining, based on the frame that includes the phase measurement and the amplitude measurement, information indicating a second direction, wherein the determining the position is based on the second direction. In an aspect, the method further includes determining a phase measurement and an amplitude measurement associated with at least one training subfield, and the determining the position of the apparatus is based on the phase measurement and the amplitude measurement. In an aspect, the processing system is configured to determine the position further based on the first direction.

In another aspect of the disclosure, an apparatus for wireless communication is provided. The apparatus includes means for obtaining, from a remote apparatus, a frame including a data field and a plurality of training subfields, wherein the data field includes information indicating a different transmission direction of each of the training subfields. The apparatus includes means for determining a position of the apparatus based on the data field and the plurality of training subfields. In an aspect, the information indicates, for each of the training subfields, a respective angular offset relative to a first transmission direction associated with the data field. In an aspect, the information indicates a respective direction vector for each of the training subfields, each direction vector indicating an azimuthal angle and an elevation angle. In an aspect, the apparatus further includes means for obtaining a location of the remote apparatus, wherein the means for determining the position is configured to determine the position of the apparatus further based on the location of the remote apparatus. In an aspect, the frame further indicates the location of the remote apparatus. In an aspect, the means for determining the position is configured to determine the position based on at least one transmission direction of at least one training subfield, and another transmission direction of at least one other training subfield. In an aspect, the at least one other training subfield is included in another frame obtained from a second remote apparatus. In an aspect, the apparatus further includes means for determining a phase measurement and an amplitude measurement associated with at least one training subfield; means for outputting, for transmission to the remote apparatus, a frame that includes the phase measurement and the amplitude measurement; and means for obtaining, based on the frame that includes the phase measurement and the amplitude measurement, information indicating a second direction, wherein the means for determining the position is configured to determine the position based on the second direction. In an aspect, the apparatus further includes means for determining a phase measurement and an amplitude measurement associated with at least one training subfield, and the means for determining the position is configured to determine the position based on the phase measurement and the amplitude measurement. In an aspect, the means for determining the position is configured to determine the position further based on the first direction.

In another aspect of the disclosure, a computer-readable medium comprising codes for wireless communication is provided. The computer-readable medium includes codes for wireless communication executable to cause an apparatus to obtain, from a remote apparatus, a frame including a data field and a plurality of training subfields, wherein the data field includes information indicating a different transmission direction of each of the training subfields. The computer-readable medium includes code to determine a position of the apparatus based on the data field and the plurality of training subfields.

In another aspect of the disclosure, a wireless node is provided. The wireless node includes a processing system configured to: generate a frame including a data field and a plurality of training subfields, wherein the data field includes information indicating a different direction for transmitting each of the training subfields. The wireless node includes a transmitter configured to transmit the data field in a first direction and the training subfields in their respective different directions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
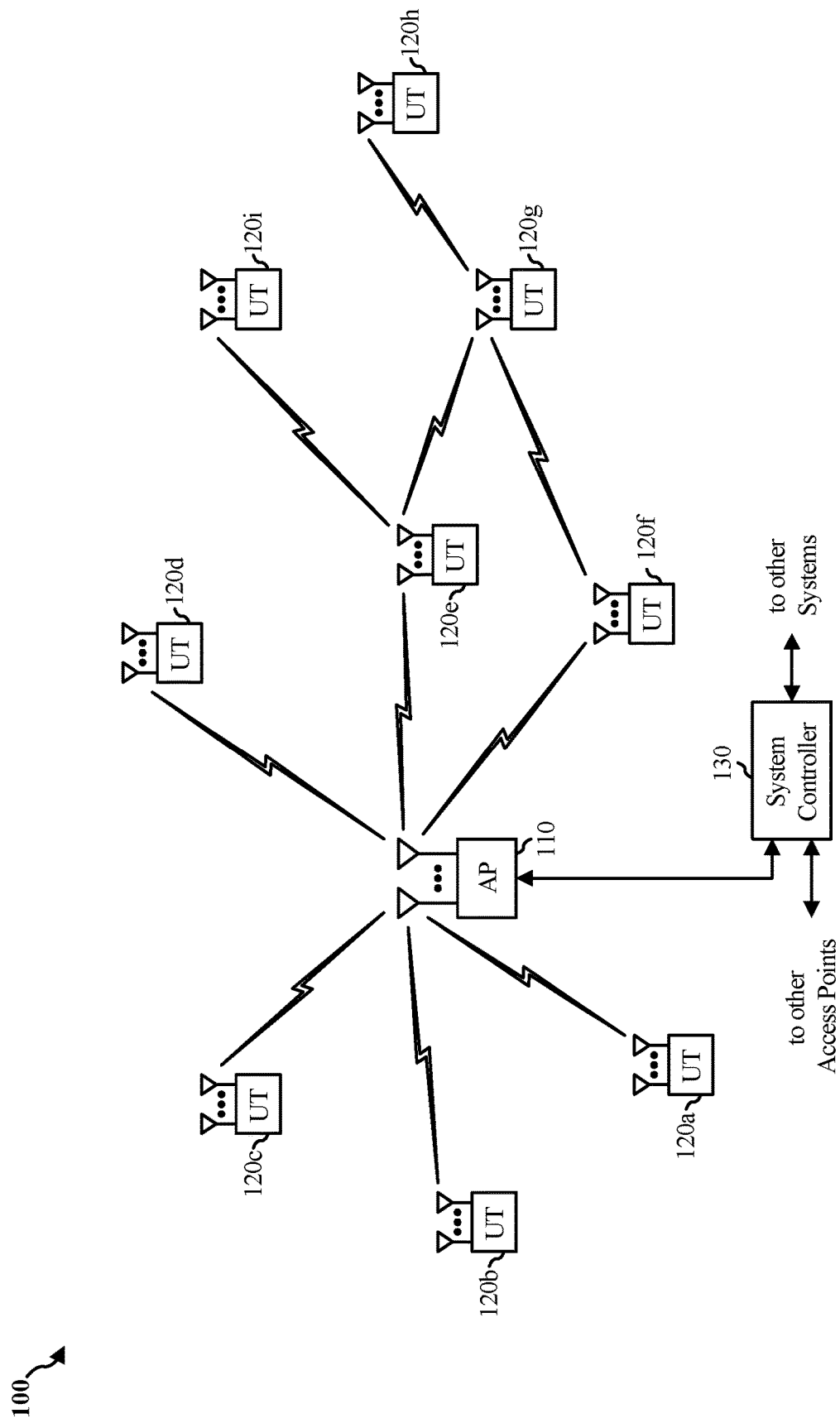
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless node, a wireless node, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
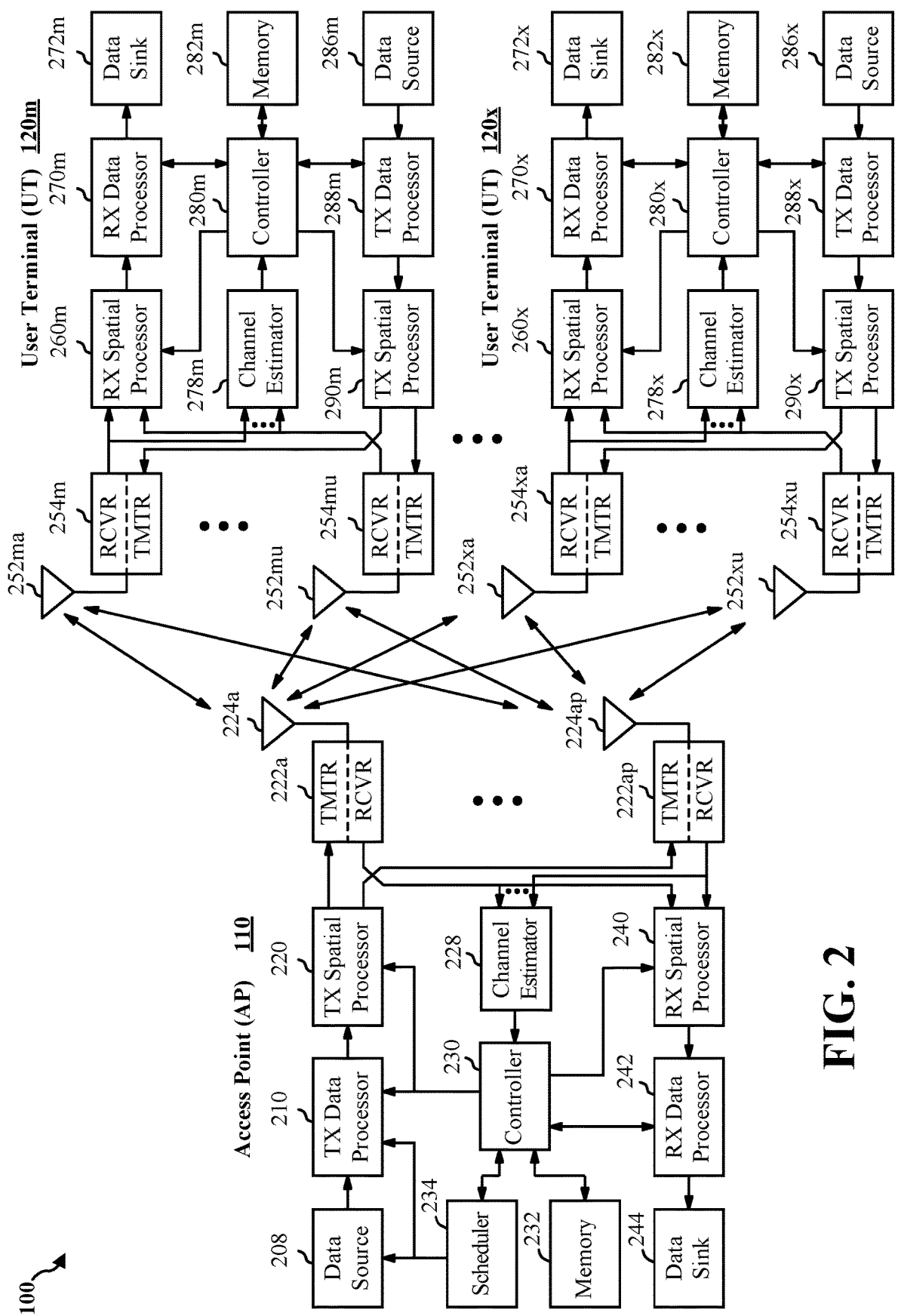
FIG. 2 illustrates a block diagram of an example access point (AP) and user terminals (UTs), in accordance with certain aspects of the present disclosure.

FIG. 2 illustrates a block diagram of access point 110 and two user terminals 120m and 120x in MIMO system 100 that may be examples of the access point 110 and user terminals 120 described above with reference to FIG. 1 and capable of performing the techniques described herein. The various processors shown in FIG. 2 may be configured to perform (or direct a device to perform) various methods described herein.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $N_{up}$ user terminals simultaneously transmit on the uplink, while Nan user terminals are simultaneously transmitted to on the downlink by the access point 110. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, signal-to-noise ratio (SNR) estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain standards, such as the IEEE 802.11ay standard currently in the development phase, extend wireless communications according to existing standards (e.g., the 802.11ad standard) into the 60 gigahertz (GHz) band. Example features to be included in such standards include channel aggregation and Channel-Bonding (CB). In general, channel aggregation utilizes multiple channels that are kept separate, while channel bonding treats the bandwidth of multiple channels as a single (wideband) channel.

Operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
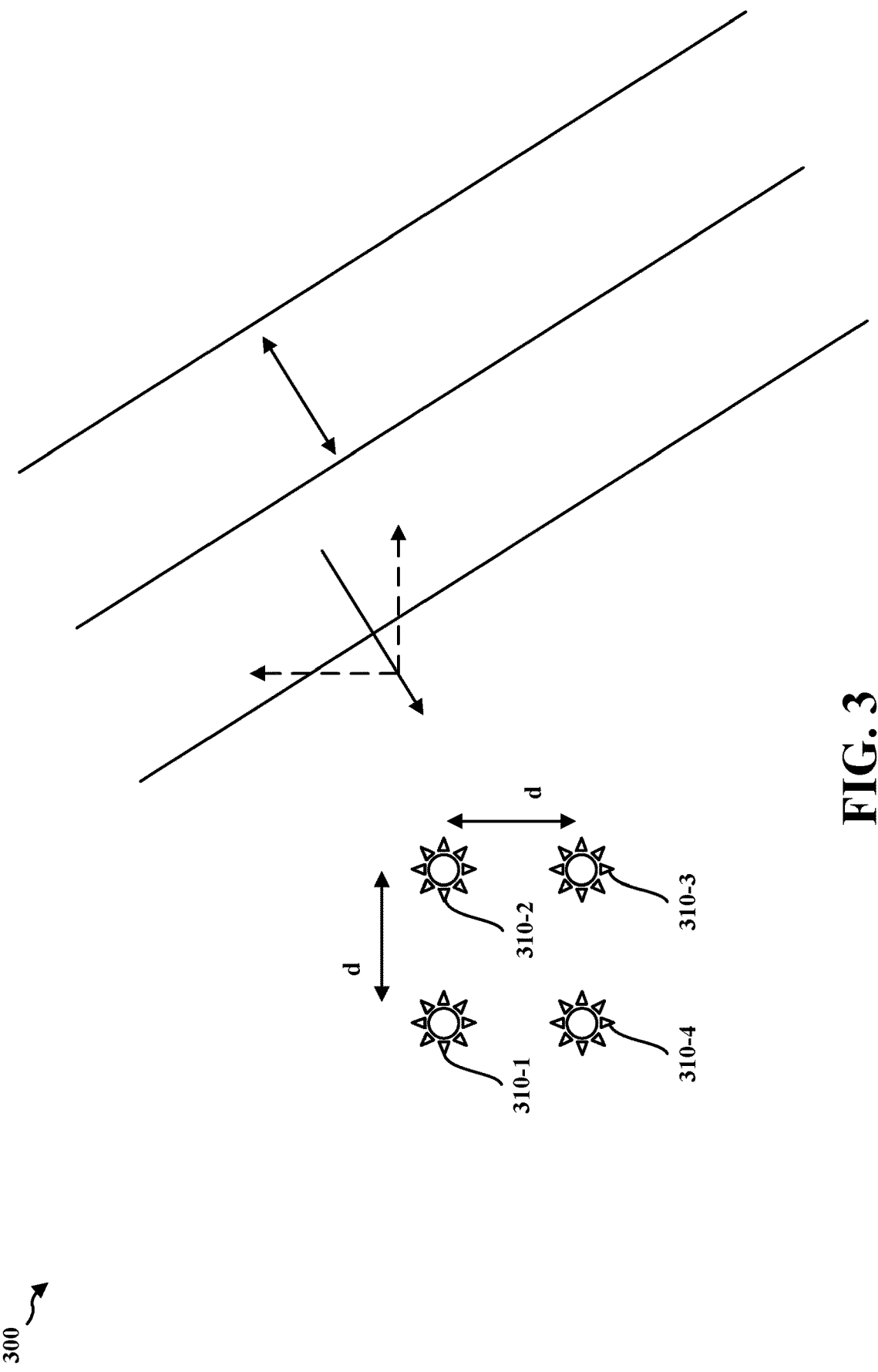
FIG. 3 illustrates a diagram of signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Beamforming Training Procedure

In high-frequency communication systems (e.g., mmWave communication systems) like 60 GHz (e.g., 802.11ad and 802.11ay), communication is based on beamforming (BF), using phased arrays on both sides for achieving good link. BF generally refers to a mechanism used by a pair of STAs to adjust transmit and/or receive antenna settings achieve desired link budget for subsequent communication.

As described, infra, in some aspects, frames transmitted during BF training may be used for positioning purposes.

Figure 4:
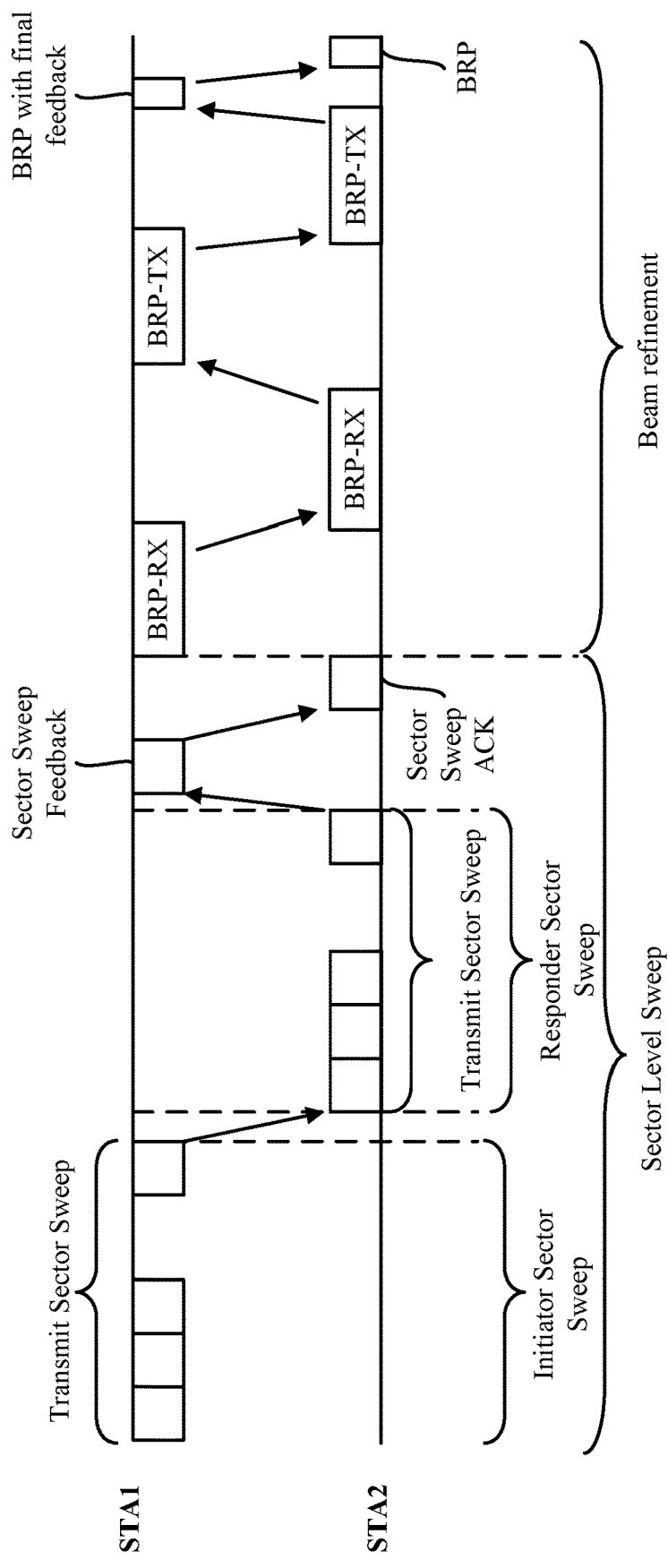
FIG. 4 illustrates an example beamforming training procedure, in accordance with certain aspects of the present disclosure.

As illustrated in FIG. 4, BF training 400 typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission is sent using a different sector (covering a directional beam of a certain width) identified in the frame and provides the necessary signaling to allow each STA to determine appropriate antenna system settings for both transmission and reception.

Still with reference to FIG. 4, in cases in which an AP has a large number of antenna elements, the sectors used may be relatively narrow, causing the SLS (Sector Level Sweep) process to be long. The higher the directivity more sectors are needed and therefore the SLS is longer. As an example, an AP with an array of 100 antenna elements may use 100 sectors. This situation is not desired since SLS is an overhead affecting throughput, power consumption and induces a gap in the transport flow.

Various techniques may be used to try to reduce throughput time. For example, short sector sweep (SSW) (SSSW) messages may be used instead of the SSW messages, which may save some time (e.g., about 36%). In some cases, throughput may be reduced by utilizing the fact that in such APs the transmitter can transmit via several RF chains. Transmission via several RF chain may facilitate transmission in parallel on several single channels and can shorten the scan by the factor number of frequencies (2, 3, or 4). However, this approach may require the receiver to support the multiple frequencies scan, may not be backward compatible (e.g., with 802.11ad devices), and may involve the stations being fully aware of this special mode in advance. In some cases, the Tx SLS+Rx SLS or the Tx SLS+Rx BRP may be replaced with a new Tx+Rx BRP where only one "very" long BRP message is used with many training (TRN) units. Unfortunately, this approach requires a very long message, but may be able to support multiple STAs in parallel, making this approach efficient in cases with a large number of STAs.

Example Positioning Based on Directional Transmissions

Aspects of the present disclosure may provide for positioning determination (e.g., passive positioning estimation) based on directional transmissions. Various approaches described herein may allow a wireless apparatus (e.g., an STA) to determine the position of the wireless apparatus by utilizing transmissions that are sent in different directions by remote apparatuses (e.g., APs), such as frames transmitted during a sector sweep procedure. As used herein, "position" may refer to "location" and/or "orientation," either relative to some point of reference or absolute (e.g., earth or geographic coordinates), and may include angles of elevation and azimuth.

Such positioning estimates may be used for a variety of purposes, such as updating scene information in virtual reality (VR) and/or augmented reality (AR) applications, based on a relative position and/or orientation of a wireless apparatus. In some examples, an estimated position of the wireless apparatus may be provided to an application layer of the wireless apparatus. In other example, an estimated position of the wireless apparatus may be reported to a remote apparatus (e.g., an AP, controller, location server, etc.), e.g., for tracking the wireless apparatus. In yet another example, an estimated position of the wireless apparatus may be used to determine available services in an area.

In some aspects, approaches described herein may be performed based on transmissions that are scheduled to occur. For example, certain applications like VR and AR typically demand high gain beam links for each data transaction. Periodic beamforming training (or refinement) for each link access may be used to meet this demand. This periodic training may also provide opportunities for position estimation (e.g., passive position estimation).

As communication networks become increasingly populated by wireless nodes, more efficient methods for determining (e.g., estimating) a position or location of user terminals may prove beneficial. In WLAN systems, for example, protocols to support positioning in the 2.4 gigahertz (GHz) band, 5 GHz band, and also the 60 GHz may be used. Examples of current approaches to positioning includes protocols based on round trip time (RTT) and angle of arrival (AOA). RTT and AOA may need separate frame exchanges between APs and STAs for measuring RTT and AOA, respectively. As the number of STAs attempting to determine position information increases (e.g., up to 200 STAs per AP for IEEE 802.11 scalability standards), the frame exchanges needed for measuring RTT and AOA consume a relatively large amount of air time, which may impede data transmissions. Therefore, an angle of departure (AOD) approach may be implemented.

In an AOD approach, an AP may include information indicating a direction of transmission (e.g., angle) in a frame. When an STA receives the frame, the STA may estimate the position of the STA using a line (e.g., vector) extending in the direction (e.g., angle) of the position of the transmitting AP. For example, the STA may receive a plurality of frames, each from a different AP, and the STA may estimate the position of the STA based on the intersection of lines extending in the directions of the positions of the transmitting APs. AOD may not require stringent synchronization (e.g., frame exchanges) between the STA and one or more APs. However, AOD may be relatively inaccurate (e.g., compared to RTT and/or AOA) because AOD is limited by the number of sectors (e.g., directions of transmission) in which an AP may transmit a frame. The accuracy of AOD may further be limited based on the width of each beam because a frame may be transmitted only through the center of the beam. Accordingly, the accuracy of AOD may be improved by increasing the number of directions of transmission, such as by directing beams in many directions of one sector (e.g., instead of transmitting the frame only through the center of the beam).

Figure 5:
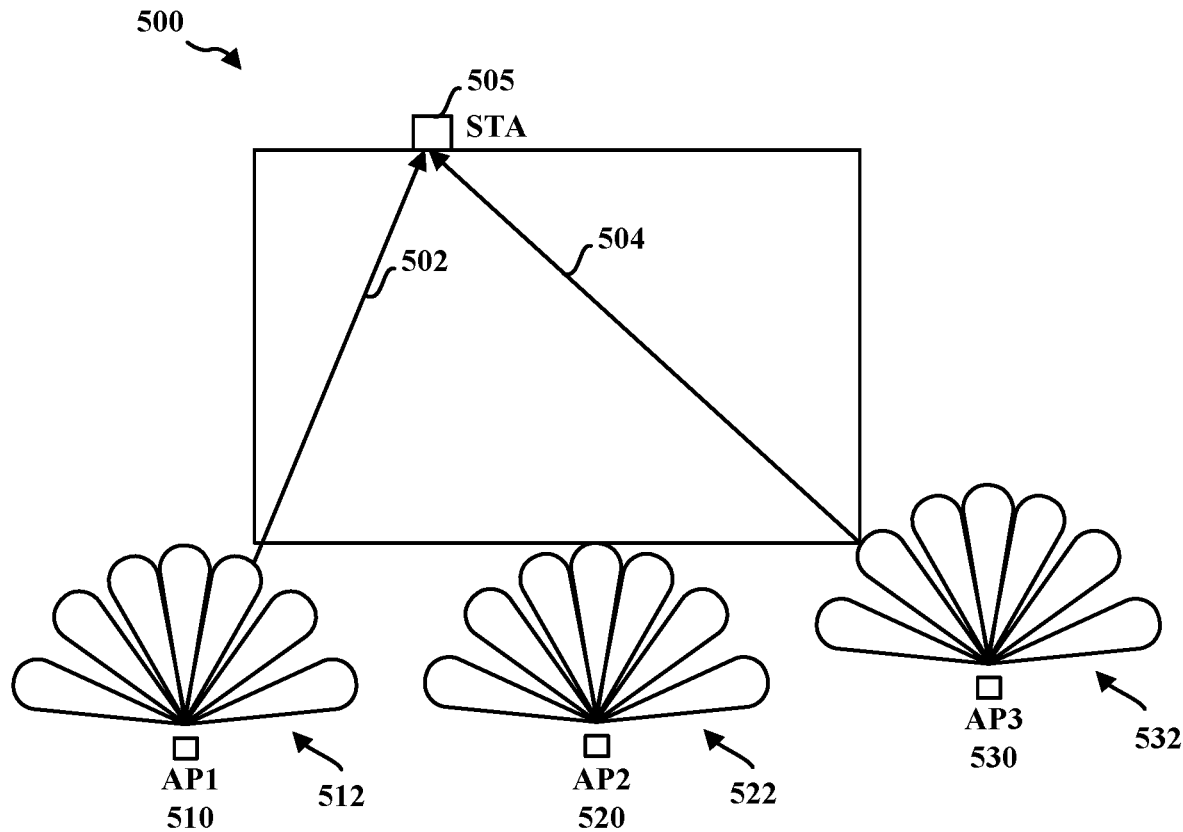
FIGS. 5 and 6 illustrate example directional transmissions from apparatuses that may be used to determine a position according to an angle of departure (AOD) approach, in accordance with certain aspects of the present disclosure.
Figure 6:
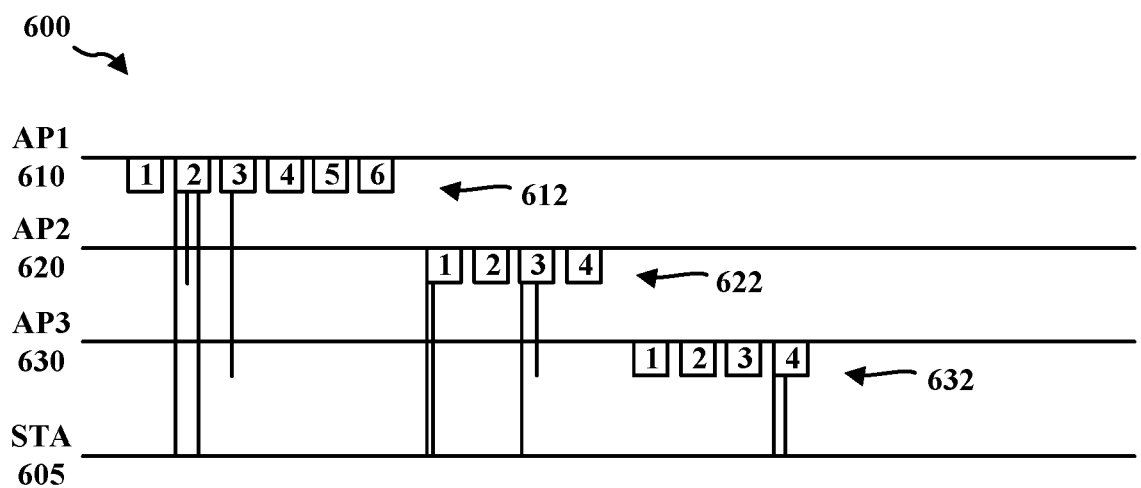

FIGS. 5 and 6 illustrate example diagrams of directional transmissions from apparatuses that may be used to determine a position according to AOD approaches 500, 600, in accordance with certain aspects of the present disclosure. For AOD-based positioning, each AP 510, 520, 530 may transmit frames during a transmit sector sweep across transmit sectors 512, 522, 532, respectively. As illustrated, the first AP 510 may sweep using different transmit sectors 512, the second AP 520 may sweep using different transmit sectors 522, and the third AP 530 may sweep using different transmit sectors 532. For example, the first AP 510 may transmit frames in many different directions in order to facilitate selection of a best transmit sector for the STA 505.

In various aspects, each AP 510, 520, 530 may indicate, in each transmitted frame, information (e.g., in an information element (IE)) indicating a direction of transmission (e.g., absolute direction using earth coordinates, relative direction using an angle of offset relative to the transmitting AP) in which the frame is transmitted. Further, each AP 510, 520, 530 may provide the respective location of each AP 510, 520, 530, for example, in each transmitted frame (e.g., in an IE) or in another frame (e.g., a frame transmitted in a 2.4 GHz or 5 GHz band). If an AP provides information indicating the location of the AP in another band (e.g., 2.4 GHz or 5 GHz), that AP may omit the location of that AP from frames transmitted during a sector sweep.

In aspects, an STA 505 may obtain, from a first AP 510, a first frame 502 indicating a first direction of transmission of the first frame. Similarly, the STA 505 may obtain, from a third AP 530, a third frame 504 indicating a third direction of transmission of the third frame.

In some aspects, the STA 505 may similarly obtain, from the second AP 520, a second frame indicating a direction of transmission of the second frame. In other aspects, the STA 505 may not receive the second frame.

The STA 505 may estimate a position of the STA 505 based on the first direction, the third direction, the position of the first AP 510, and the position of the third AP 530. In one aspect, the STA 505 may estimate the position of the STA 505 by drawing lines (e.g., vectors) along the directions of transmission of the frames to the transmitting APs, and the STA 505 may estimate the position of the STA 505 as the intersection of those lines. For example, the STA 505 may draw a first line from the direction of transmission of the first frame 502 to the location of the first AP 510, and the STA 505 may draw a second line from the direction of transmission of the third frame 504 to the location of the third AP 530. The STA 505 may estimate the position of the STA 505 as the intersection of the first and second lines.

In order to estimate the position of the STA 505 in two dimensions, the STA 505 may need to intersect lines from at least two APs (e.g., the first AP 510 and the third AP 530). In order to estimate the position of the STA 505 in three dimensions, the STA 505 may need to intersect lines from at least three APs (e.g., the first AP 510, the second AP 520, and the third AP 530).

As illustrated in FIG. 6, the STA 605 does not need APs to transmit sector sweeps concurrently. In the illustrated aspect, the first AP 610 transmits frames 612 (e.g., through sectors 512), then the second AP 620 transmits the frames 622 (e.g., through sectors 522), and then the third AP 630 transmits the frames 632 (e.g., through sectors 532). Each frame may be transmitted through approximately the center of a sector and may include an indication of the transmit sector used for transmission. The number of frames may vary across APs—e.g., the first AP 610 may transmit sectors 1 through 6, the second AP 620 may transmit sectors 1 through 4, and the third AP 630 may transmit through sectors 1 through 4).

As illustrated, some frames may reach the STA 605 while other frames may not reach the STA 605. In the illustrated aspect, the STA 605 is able to obtain a first frame transmitted through sector 2 from the first AP 610, a second frame transmitted through the sector 1 of the second AP 620, and a third frame transmitted through sector 4 of the third AP 630.

Given the information in each frame indicating the direction of transmission, as well as information obtained indicating the location of each AP 610, 620, 630, the STA 605 may estimate the position of the STA 605 (e.g., absolute position, position relative to the APs 610, 620, 630).

While this AOD approach may be relatively accurate, the accuracy may be limited based on the width of each transmit sector (e.g., because each frame is transmitted through the approximate center of each sector). For example, the sector width may vary between 30° for relatively smaller antenna arrays and 5° for relatively larger antenna arrays. In view of the foregoing, an STA may benefit from an increased number of beams in an increased number of directions (as opposed to one beam through the center of each sector). Given an increased angular resolution (e.g., greater number of directions of transmission) for one or more APs, the STA may more accurately determine the position of the STA. However, transmitting an increased number of frames in an increased number of directions may increase overhead because of the size of frames. The present disclosure provides an approach to AOD that may increase the angular resolution without the overhead commensurate with transmitting a frame in each direction.

Figure 7:
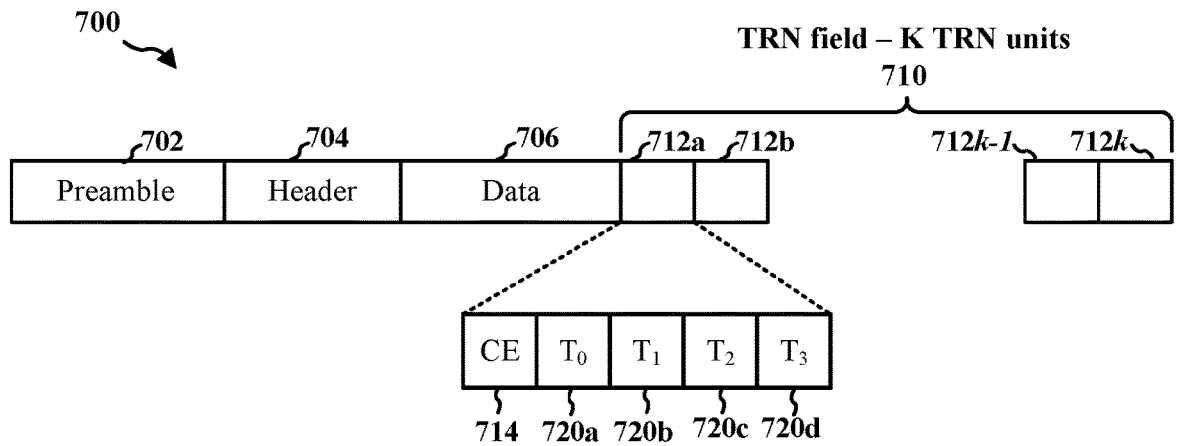
FIG. 7 illustrates a diagram of a frame that may be used with an AOD approach, in accordance with certain aspects of the present disclosure.

FIG. 7 illustrates a diagram of a frame 700 that may be used with an AOD approach, in accordance with certain aspects of the present disclosure. As described, supra, a frame may be transmitted in the direction of transmission for an AOD-based position estimation. In order to improve the accuracy of a transmit sector sweep based on AOD position estimation, a TRN field 710 may be added to a frame 700 (e.g., a sector sweep packet). The TRN field 710 may be standard according to IEEE 802.11 (e.g., 802.11ad standard, similar in 802.11ay).

In aspects, the TRN field 710 may be composed of a plurality of TRN units 712*a-k*. Each TRN unit 712 may be composed of a channel estimation (CE) field 714 and a plurality of TRN subfields 720*a-d*. Each TRN subfield 720*a-d* may include a sequence, such as a Golay sequence. Although 4 TRN subfields are illustrated, the present disclosure comprehends any number of subfields and/or the omission of a CE field.

In order to increase the angular resolution for AOD-based position estimation, each TRN subfield 720*a-d* may be transmitted in a different direction. Each TRN subfield 720*a-d* may be transmitted in a different direction (e.g., transmitted through a different beam), with all those different directions covering a relatively small set of directions around the center of a sector (e.g., the center beam). In an aspect, each TRN subfield 720*a-d* is transmitting using a different antenna element of a set of antenna elements.

In aspects, a portion of the frame 700 may be transmitted through approximately the center of a sector (e.g., a center beam). For example, the preamble field 702, header field 704, and/or data field 706 may be transmitted through approximately the center of a sector. While many training units 712*a-k* (and, therefore, many training subfields 720*a-d*) may be transmitted for each sector, the preamble field 702, the header field 704, and/or the data field 706 may be transmitted only once per sector.

The data field 706 may include information indicating a different direction for transmitting each of the training subfields 720*a-d*. The information may include, for example, an azimuthal angle and a elevational angle. In one aspect, the data field 706 may indicate an angular offset for each of the training subfields 720*a-d* that indicates the offset of the beam through which each of the training subfields is transmitted relative to the approximate center of the sector. In another aspect, the data field 706 may indicate a direction vector each of the training subfields 720*a-d* that indicates an azimuthal angle and an elevation angle, for example, relative to some point of reference such as an access point.

In an aspect, the data field 706 may the different direction for transmitting each of the training subfields 720*a-d* by indicating correspondence between each of training subfields 720*a-d* and their respective different directions. For example, the data field 706 may indicate information mapping each of the training subfields 720*a-d* to their respective different directions, such as by using respective sequence numbers corresponding to each of the training subfields 720*a-d* or respective Golay sequences corresponding to each of the training subfields. The data field 706 may include a bitmap.

Figure 8:
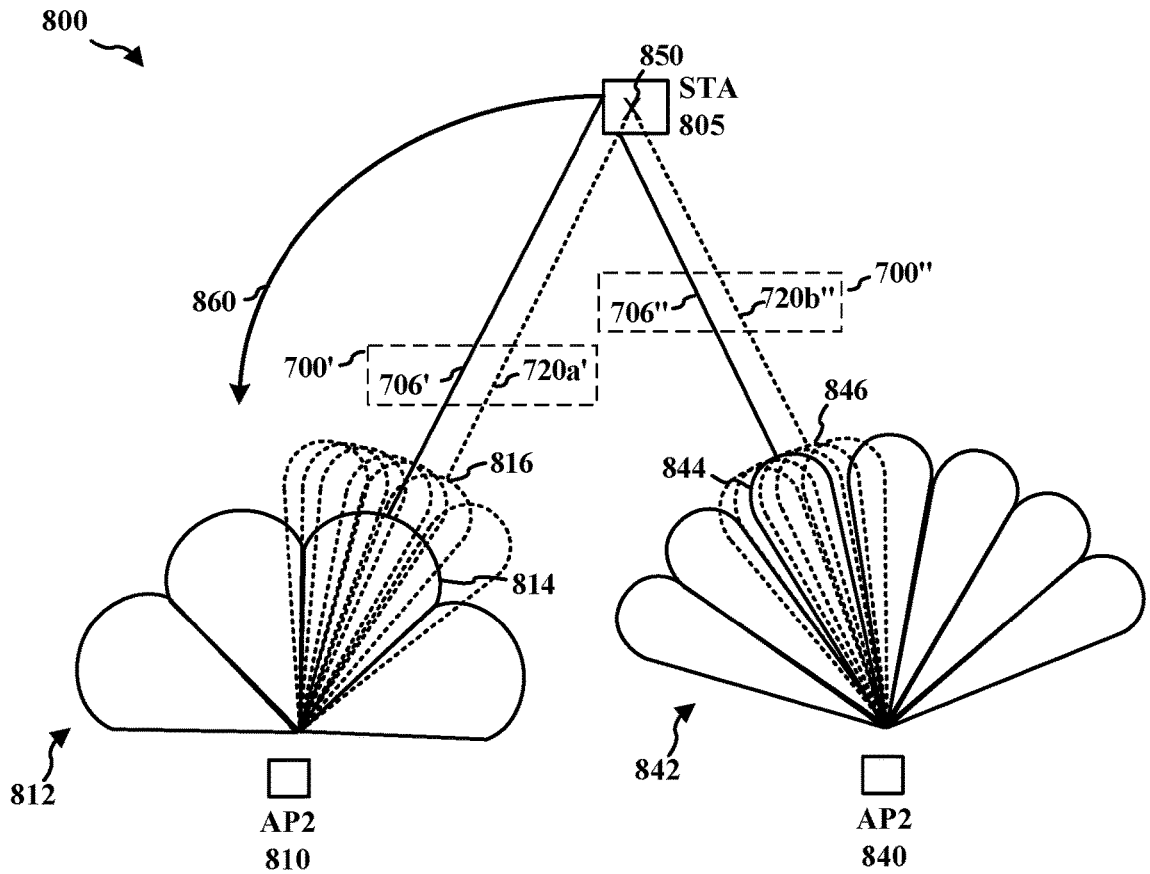
FIG. 8 illustrates example directional transmissions from apparatuses that may be used to determine a position according to an AOD approach, in accordance with certain aspects of the present disclosure.

In FIG. 8, example directional transmissions from apparatuses that may be used to determine a position according to an AOD approach, in accordance with certain aspects of the present disclosure. In the AOD approach 800, the first AP 810 may transmit a sector sweep 812. For at least one sector transmitted during the sector sweep 812, the first AP 810 may transmit a first frame 700', including, inter alia, a first data field 706' and a first training subfield 720*a'*.

In aspects, the first AP 810 may include a processing system (e.g., as described with respect to FIG. 10) that may generate the first frame 700' to include the first data field 706' and a plurality of training subfields, including the first training subfield 720*a'*. The first AP 810 may generate the first frame 700' to include, in the first data field 706', information indicating a different direction for transmitting each of the training subfields, including a different direction 816 for transmitting the first training subfield 720*a'*. In one aspect, the first AP 810 may determine a first direction 814 (e.g., a first transmit beam) in which the first data field 706' is to be transmitted (e.g., with a preamble field 702 and a header field 704). The first direction 814 may be approximately the center of the sector of the sector sweep 812 in which the first data field 706' is transmitted.

The first AP 810 may further determine a different direction 816 (e.g., a different transmit beam) in which the first training subfield 720*a'* is to be transmitted. The first AP 810 may determine the different direction 816 as an angular offset from the first direction 814 or may determine the different direction 816 as a direction vector (e.g., indicating an azimuthal angle and an elevation angle with respect to the first AP 810 or an antenna array of the first AP 810). The first AP 810 may include, in the first data field 706', information indicating the different direction 816 for transmitting the first training subfield 720*a'*. The information indicating the different direction 816 may include, for example, information indicating a correspondence between the different direction 816 and the first training subfield 720*a'*.

Figure 10:
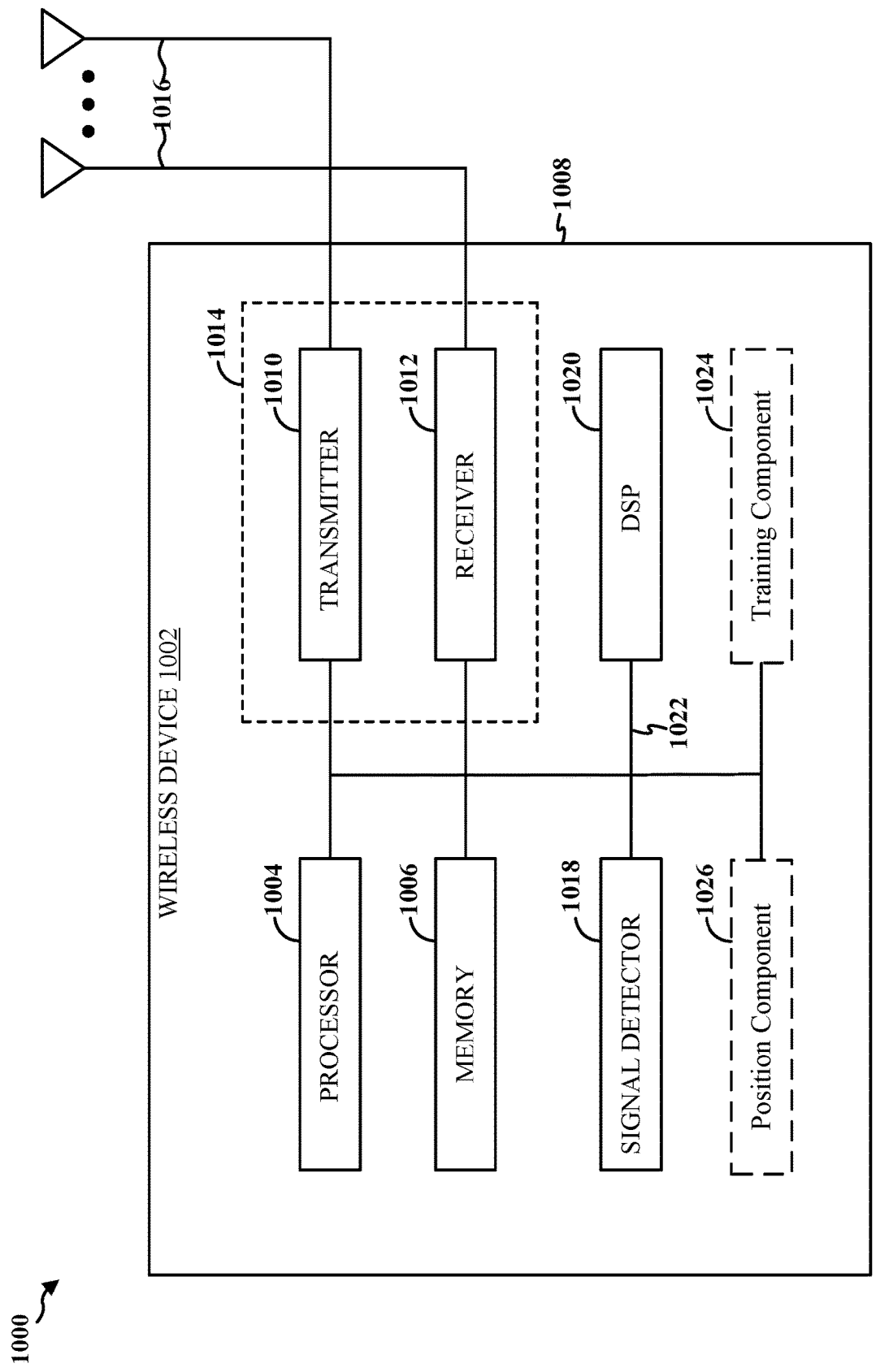
FIG. 10 shows an example functional block diagram of a wireless device configured to transmit and receive information one or more channels, in accordance with certain aspects of the present disclosure.

The first AP 810 may further include an interface (e.g., as described with respect to FIG. 10). The interface of the first AP 810 may output the first frame 700' for transmission with the first data field 706' in the first direction 814 (e.g., using a first transmit beam) and the first training subfield 720*a'* in the different direction 816 (e.g., using a different transmit beam proximate to the first transmit beam).

The first AP 810 may further include a transceiver (e.g., as described with respect to FIG. 10). The transceiver of the first AP 810 may transmit the first frame 700' over the air in the first direction 814 (e.g., the first transmit beam) and in the different directions (e.g., different beams) of the training subfields, including the different direction 816 (e.g., the different beam). In an aspect, the first AP 810 and the STA 805 may be unsynchronized and, therefore, the first AP 810 may transmit the first frame 700' without addressing the first frame 700' to the STA 805.

In one aspect, the first AP 810 may further transmit a first location of the first AP 810. For example, the processing system of the first AP 810 may include, in the data field 706', information indicating a location of the first AP 810 (e.g., in coordinates). In another aspect, the processing system of the first AP 810 may generate another frame that includes information indicating the first location. The transceiver of the first AP 810 may transmit the other frame in the same network as the first frame 700' (e.g., in a 60 GHz network) or in another network (e.g., a 2.4 GHz network or a 5 GHz network).

In one aspect, the first AP 810 may transmit the sector sweep 812 with a first beam width. The first AP 810 may transmit the first data field 706' in the first direction 814 with the first beam width. Around the first direction 814, the first AP 810 may transmit the training subfields in their respective different directions (e.g., with angular offsets between an upper bound and a lower bound). For example, the first AP 810 may transmit the first training subfield 720a' in the different direction 816 with a second beam width. In the illustrated aspect of the first AP 810, the first beam width may be approximately greater than the second beam width.

Thus, the first AP 810 may transmit a first portion of the first frame 700' in a first direction (e.g., a first transmit beam), while transmitting a second portion of the first frame 700' in a different direction (e.g., a different transmit beam). The first portion may include at least the first data field 706' (as well as the preamble field 702 and header field 704) transmitted at approximately a center of a sector of the sector sweep 812, while the second portion may include at least the first training subfield 720a' transmitted at an offset from approximately the center of the sector of the sector sweep 812.

Similar to the first AP 810, the second AP 840 may include a processing system that may be configured to generate a second frame 700" including, inter alia, a second data field 706" and a plurality of training subfields, including the second training subfield 720b". As described, supra, the second data field 706" may include information indicating a different direction for transmitting each of the training subfields, including a different direction for transmitting the second training subfield 720b".

The second AP 840 may include an interface configured to output the second frame 700" for transmission with the second data field 706" in a first direction 844 (e.g., a first beam) and transmission with the training subfields in their respective different directions, including transmitting the second training subfield 720b" in the different direction 846 (e.g., a different beam).

In an aspect, the second AP 840 may include a transceiver for transmitting the sector sweep 842 with a first beam width. The second AP 840 may transmit the second data field 706" in the first direction 844 with the first beam width. Around the first direction 844, the second AP 840 may transmit the training subfields in their respective different directions (e.g., with angular offsets between an upper bound and a lower bound). For example, the second AP 840 may transmit the second training subfield 720b" in the different direction 846 with a second beam width. In the illustrated aspect of the second AP 840, the first beam width may be approximately equal to the second beam width.

The STA 805 may include a transceiver (e.g., as described with respect to FIG. 10). The transceiver of the STA 805 may receive the first frame 700', including the first data field 706' and the plurality of training subfields (including the first training subfield 720a'). The transceiver of the STA 805 may receive the first data field 706' in a first direction (e.g., a first receive beam), but may receive the first training subfield 720a' in a second direction (e.g., a second receive beam, which may be the same or different from the first receive beam).

The STA 805 may include an interface (e.g., as described with respect to FIG. 10). The interface of the STA 805 may obtain, from the first AP 810, the first frame 700' including the first data field 706' and a plurality of training subfields, including the first training subfield 720a'.

Similarly, the transceiver of the STA 805 may receive the second frame 700" and the interface of the STA 805 interface of the STA 805 may obtain, from the second AP 840, the second frame 700" including the second data field 706" and a plurality of training subfields, including the second training subfield 720b".

In various aspects, the interface of the STA 805 may be configured to obtain a first location of the first AP 810 and a second location of the second AP 840. The first and second locations may be, for example, respective coordinates indicating a respective location. In one aspect, the first data field 706' may include the first location and/or the second data field 706" may include the second location. In another aspect, the STA 805 may receive the first location and/or the second location in another frame, such as a frame in a 2.4 GHz network and/or a 5 GHz network.

In one aspect, the processing system of the STA 805 may be configured to determine (e.g., estimate) a position of the STA 805 based on the first data field 706', the first training subfield 720a', the first location of the first AP 810, the second data field 706", the second training subfield 720b", and the second location of the second AP 840.

In one aspect, the processing system of the STA 805 may determine (e.g., select) a "best" training subfield for each AP 810, 840. For the first AP 810, the STA 805 may measure a quality (e.g., an SNR) associated with each direction (e.g., beam) for each of the received training subfields. The STA 805 may determine (e.g., identify) the "best" quality (e.g., highest SNR) of the measured qualities, which may indicate the "best" direction. For example, the STA 805 may determine that the first training subfield 720a' corresponds to the best direction. The STA 805 may determine the direction of the first training subfield 720a' by determining a first angle corresponding to the first training subfield 720a', as indicated by the first data field 706'.

For the second AP 840, the STA 805 may similarly measure qualities associated with directions of the training subfields. The STA 805 may determine the second training subfield 720b" corresponds to a best direction, and the STA 805 may determine a second angle of that best direction by identifying information in the second data field 706" indicating an angle corresponding to the second training subfield 720b".

With the first angle, the STA 805 may draw or trace a first line (e.g., vector) extending between the STA 805 and the first location of the first AP 810. With the second angle, the STA 805 may draw or trace a second line (e.g., vector) extending between the STA 805 and the second location of the second AP 840. The STA 805 may determine (e.g., estimate) the position of the STA 805 based on the intersection 850 of the first line and the second line at the STA 805 (e.g., given position vector equations associated with the information provided).

While the AOD approach 800 illustrates that the STA 805 receives two training subfields 720a', 720b", other configurations are contemplated herein. For example, the STA 805 may determine (e.g., estimate) a position of the STA 805 based on the first training subfield 720a' and the position of the first AP 810, and also based on a location of a second AP and a frame from that second AP that includes AOD information but not a training subfield (e.g., when the second AP does not transmit training subfields in a plurality of different directions around the center of a sector sweep). Further, while the AOD approach illustrates that the STA 805 determines a position based on the intersection of two lines, the STA 805 may determine a position based on an intersection of any number of lines received from any number of APs. For example, the STA 805 may estimate the position of the STA 805 using two intersecting lines from two APs (e.g., for two dimensions), and may estimate the position of the STA 805 using three intersecting lines from three APs (e.g., for three dimensions).

In a further aspect, the processing system of the STA 805 may determine (e.g., measure) at least one of a phase measurement and/or amplitude measurement associated with the first training subfield 720a', for example, in order to increase the accuracy of the position estimation. For example, the processing system of the STA 805 may measure a phase difference between two training subfields 720a', 720c' and/or may measure an amplitude measurement for at least one of the two training subfields 720a', 720c' transmitted by the first AP 810.

According to one aspect, the STA 805 may have stored data from which the STA 805 may extrapolate the "best" direction based on the at least one of the phase measurement and/or amplitude measurement. For example, the first AP 810 may send information indicating a subset of antenna elements (e.g., for a sector) used by the first AP 810 for transmitting the training subfields, which may be stored by the STA 805. The STA 805 may determine the "best" direction that corresponds to the at least one of the phase measurement and/or amplitude measurement based on the subset of antenna elements. In an aspect, the STA 805 may further determine the position of the STA 805 based on the first direction 814. For example, the STA 805 may generate a steering vector based on the phase measurement and/or amplitude measurement and may determine, as the "best" direction, a direction from the subset of antenna elements that corresponds to the generated steering vector. The STA 805 may use this "best" direction for position estimation, for example, by drawing a line (e.g., vector) between the STA 805 and the first location of the first AP 810 in the "best" direction.

In one aspect, the interface of the STA 805 may output a frame 860 for transmission to the first AP 810, and the frame 860 may include at least one of the phase measurement and/or amplitude measurement. This aspect may be similar to the concept of providing channel measurement feedback based on training subfields, e.g., as described with respect to IEEE 802.11ad.

The interface of first AP 810 may obtain, from the STA 805, the frame 860 including the at least one of the phase measurement and/or amplitude measurement. Based on the at least one of the phase measurement and/or amplitude measurement, the first AP 810 may determine a "best" direction for use by the STA 805 in position estimation. For example, the processing system of the first AP 810 may generate a steering vector based on the at least one of the phase measurement and/or amplitude measurement. The processing system of the first AP 810 may compare the generated steering vector to one or more stored steering vectors, each being associated with a different direction. The processing system of the first AP 810 may then identify a "best" direction for the STA 805 based on the comparison of the generated steering vector with the one or more stored steering vectors. In an aspect, the first AP 810 may further identify the "best" direction based on the first direction 814. For example, the first AP 810 may generate the steering vector further based on the first direction 814. In various aspects, different algorithms may be used by the first AP 810 in order to identify the "best" direction based on the generated steering vector.

In one aspect, the interface of the first AP 810 may output another frame that includes information indicating the identified "best" direction for the STA 805. The transceiver of the first AP 810 may then transmit the other frame to the STA 805. The STA 805 may use the indicated "best" direction for position estimation, for example, by drawing a line (e.g., vector) between the STA 805 and the first location of the first AP 810 in the "best" direction. In an aspect, the STA 805 may further determine the position of the STA 805 based on the first direction 814.

For larger antenna arrays (e.g., 128 antenna elements) of an AP, overhead may be increased by adding a training subfield for each of the antenna elements (e.g., 128 training subfields). This overhead may cause frame transmission to be unsatisfactorily expensive in terms of time and/or power consumption. In order to mitigate this overhead, training subfields may be transmitted in different directions using a subset of the set of antenna elements (e.g., between 8 and 16, inclusively, training subfields may be transmitted). The first AP 810 may select the transmission pattern for the different directions of the subset of antenna elements. The selected transmission pattern may cause generation of a steering vector with some ambiguity (e.g., many directions may have the same or indiscernibly different quality measurement). Such ambiguity may be resolved based on knowledge that the training subfields transmitted in different directions using the subset of the set of antenna elements were transmitted after a frame (e.g., packet) with a specific beam. Accordingly, the first AP 810 or the STA 805 may limit the search for the "best" direction around the sector in which the frame (e.g., packet) is received.

Figure 9A:
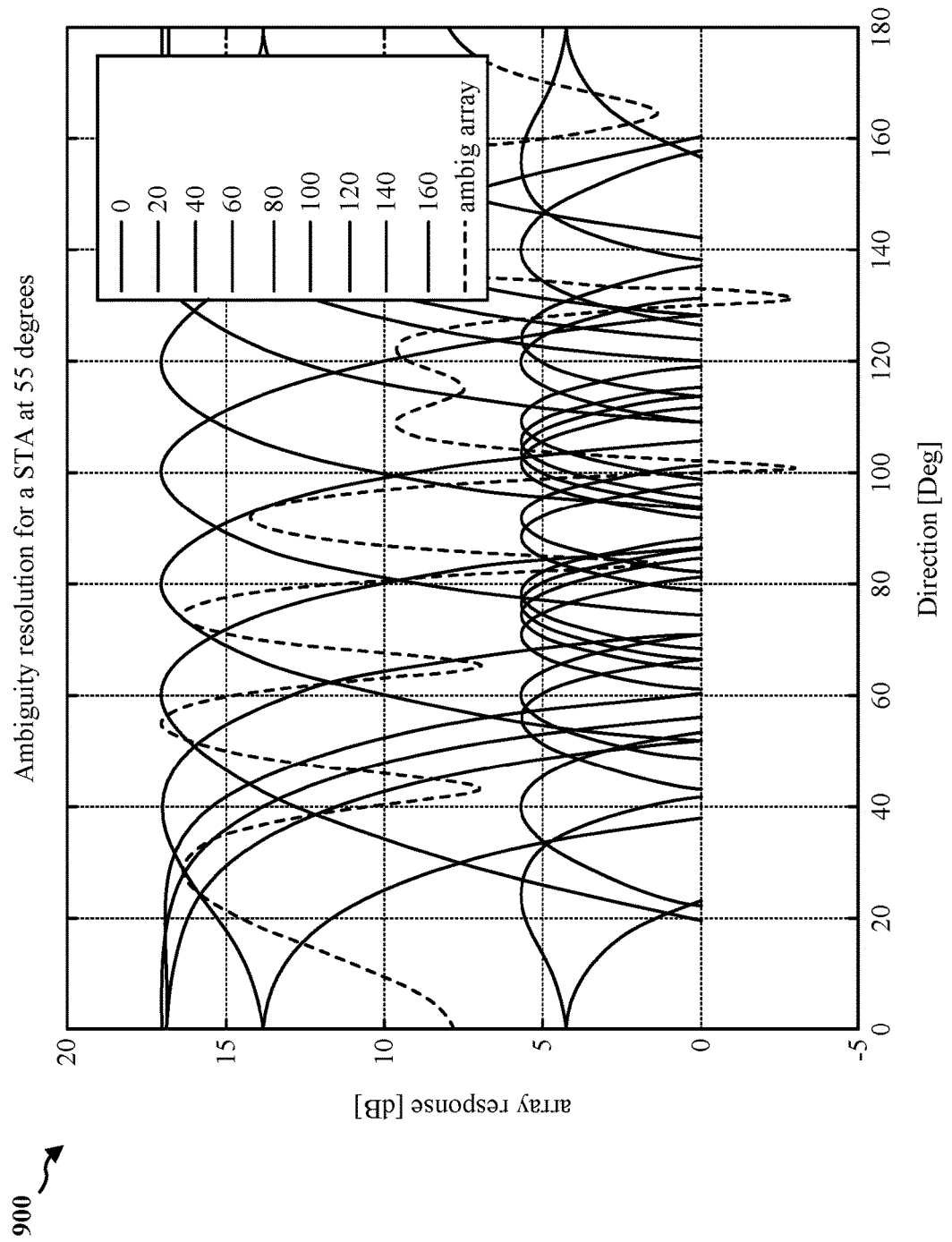
FIGS. 9A and 9B are diagrams of array responses using an AOD approach, in accordance with certain aspects of the present disclosure.
Figure 9B:
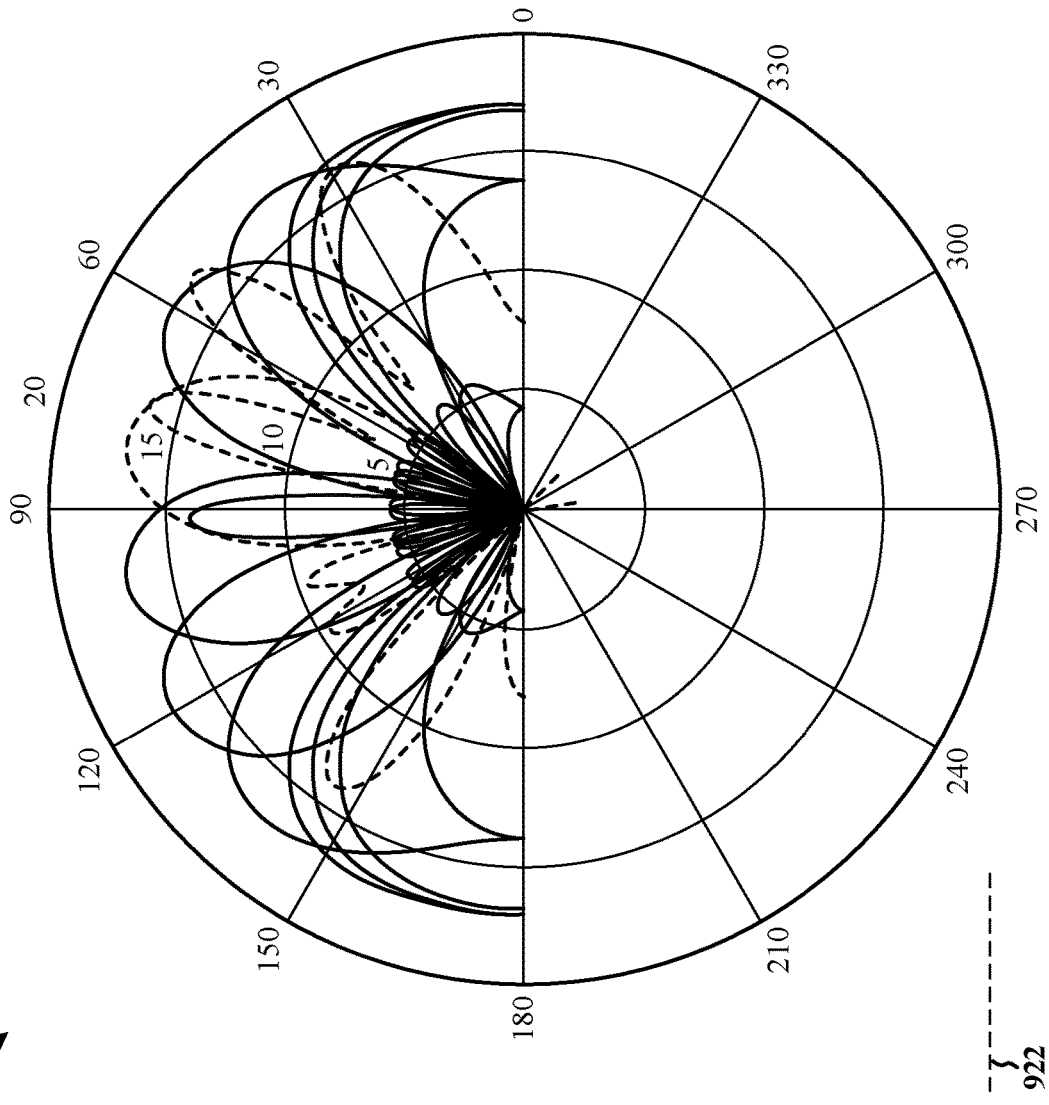

FIGS. 9A and 9B illustrate array responses 900, 920 of 9 sectors (e.g., of a sector sweep 812). As illustrated, the sectors may be separated by 20 degrees. In the illustrated example, the sectors may be generated by elements 1:4 of a uniform linear array. If the STA 805 provides 3 phase measurement and/or amplitude measurement, the first AP 810 or the STA 805 (depending on which determines the "best" direction) may identify an ambiguous array corresponding to the ambiguous array response 902. The ambiguous array response 902, for example, may correspond to antenna elements 1, 2, and 8. FIG. 9B illustrates a polar view of such an array response, including ambiguous array response 922. If the sector is known, then the first AP 810 and/or STA 805 may limit the search for the "best" direction to the known sector. For example, if the first AP 810 transmits the training subfields in different directions using a subset of the set of antenna elements for sector 2, then the first AP 810 or the STA 805 may limit the search to sector 2, such as by comparing a generated steering vector to those steering vectors of sector 2. Accordingly, the first AP 810 and/or the STA 805 may resolve ambiguity even when the first AP 810 transmits training subfields in different directions using a subset of the set of antenna elements.

In sum, at least one AP may transmit a plurality of training subfields in a plurality of different directions around the center of a sector. For each sector in which the AP transmits the plurality of training subfields, the AP may transmit one data field that indicates correspondence between each training subfield and each different direction. By transmitting a plurality of training subfields, the angular resolution may be increased. An increase in angular resolution may allow an STA to more accurately estimate the position of the STA using an AOD approach.

FIG. 10 shows an example functional block diagram of a wireless device 1002 configured to transmit and receive information on a data channel. The wireless device 1002 is an example of a device that may be configured to implement the various methods described herein. For example, the wireless device 1002 may be the AP 110 and/or the UT 120.

The wireless device 1002 may include a processor 1004 which controls operation of the wireless device 1002. The processor 1004 may also be referred to as a central processing unit (CPU). Memory 1006, which may include both read-only memory (ROM) and random access memory (RAM), may provide instructions and data to the processor 1004. A portion of the memory 1006 may also include non-volatile random access memory (NVRAM). The processor 1004 typically performs logical and arithmetic operations based on program instructions stored within the memory 1006. The instructions in the memory 1006 may be executable (by the processor 1004, for example) to implement the methods described herein.

The wireless device 1002 may also include a housing 1008, and the wireless device 1002 may include a transmitter 1010 and a receiver 1012 to allow transmission and reception of data between the wireless device 1002 and a remote device. The transmitter 1010 and receiver 1012 may be combined into a transceiver 1014. A single transmit antenna or a plurality of transmit antennas 1016 may be attached to the housing 1008 and electrically coupled to the transceiver 1014. The wireless device 1002 may also include multiple transmitters, multiple receivers, and multiple transceivers.

The wireless device 1002 may also include a signal detector 1018 that may be used in an effort to detect and quantify the level of signals received by the transceiver 1014 or the receiver 1012. The signal detector 1018 may detect such signals as total energy, energy per subcarrier per symbol, power spectral density and other signals. The wireless device 1002 may also include a digital signal processor (DSP) 1020 for use in processing signals. The DSP 1020 may be configured to generate a packet for transmission. In some aspects, the packet may comprise a physical layer convergence procedure (PLCP) protocol data unit (PPDU).

The various components of the wireless device 1002 may be coupled together by a bus system 1022, which may include a power bus, a control signal bus, and a status signal bus in addition to a data bus.

In one configuration, when the wireless device 1002 is implemented as an AP configured to transmit training subfields in different directions, the wireless device 1002 may include a training component 1024. The training component 1024 may be configured to generate a frame including a data field and a plurality of training subfields, and the data field may include information indicating a different direction for transmitting each of the training subfields. The training component 1024 may be configured to output the frame for transmission with the data field in a first direction and the training subfields in their respective different directions. In one aspect, the information indicating the different direction for transmitting each of the training subfields may indicate a different angular offset relative to the first direction for each of the training subfields. In one aspect, the information indicating the different direction for transmitting each of the training subfields may indicate a different direction vector (e.g., indicating an azimuthal angle and an elevation angle) for each of the training subfields. In an aspect, the training component 1024 may be configured to output the frame for transmission with the data field to be transmitting using a first beam width and each of the training subfields to be transmitting using a second beam width that is equal to or less than the first beam width. In an aspect, the training component 1024 may be configured to obtain, from a remote apparatus (e.g., an STA), at least one phase measurement and at least one amplitude measurement associated with at least one of the training subfields, and the training component 1024 may be configured to determine a second direction associated with the remote apparatus (e.g., STA) based on the at least one phase measurement and the at least one amplitude measurement. In an aspect, the training component 1024 may be further configured to output a second frame for transmitting to the remote apparatus, and the second frame may indicate the second direction. In an aspect, the training component 1024 may be configured to determine the second direction by generating a steering vector based on the at least one phase measurement and the at least one amplitude measurement, compare the generated steering vector to one or more stored steering vectors, and identify the second direction associated with the remote apparatus (e.g., STA) based on the comparison. In an aspect, the training component 1024 is further configured to determine the second direction based on the first direction in which the data field is transmitted. In an aspect, the training component 1024 is further configured to include, in the data field, information indicating a location of the wireless device 1002.

In another configuration, when the wireless device 1002 is implemented as an STA configured to determine a position of the STA, the wireless device 1002 may include a position component 1026. The position component 1026 may be configured to obtain, from a remote apparatus (e.g., an AP), a frame including a data field and a plurality of training subfields, and the data field may include information indicating a different transmission direction for each of the training subfields. The position component 1026 may be configured to determine (e.g., estimate) a position of the wireless device 1002 based on the data field and at least one of the plurality of training subfields. In one aspect, the information indicating the different transmission direction for each of the training subfields may indicate, for each of the training subfields, a respective angular offset relative to a first transmission direction associated with the data field. In an aspect, the information indicating the different transmission direction for each of the training subfields may indicate a respective direction vector (e.g., indicating an azimuthal angle and an elevation angle) for each of the training subfields. In one configuration, the position component 1026 may be further configured to obtain a location of the remote apparatus (e.g., AP) and determine the position of the wireless device 1002 further based on the location of the remote apparatus (e.g., AP). In one aspect, the frame (e.g., data field) further indicates the location of the remote apparatus (e.g., AP). In one aspect, the position component 1026 may be further configured determine (e.g., estimate) the position of the wireless device 1002 by estimating a position of an intersection of: a first line corresponding to at least one transmission direction of at least one training subfield and a second line corresponding to another transmission direction of at least one other training subfield. In such an aspect, the at least one other training subfield may be included in another frame obtained from a second remote apparatus (e.g., another AP). In an aspect, the position component 1026 may be further configured to determine a phase measurement and an amplitude measurement associated with at least one training subfield. In one aspect, the position component 1026 may be configured to output, for transmission to the remote apparatus (e.g., AP), a frame that includes the phase measurement and the amplitude measurement, and obtain information indicating a second direction based on the frame that includes the phase measurement and the amplitude measurement. Further to such an aspect, the position component 1026 may be further configured to determine the position based on the second direction. In an aspect, the position component 1026 may be further configured to determine the position of the wireless device 1002 based on the phase measurement and the amplitude measurement. In an aspect, the position component 1026 may further determine the position of the wireless device 1002 based on the first direction in which the data field is transmitted.

In general, an AP and STA may perform similar (e.g., symmetric or complementary) operations and/or may include similar components. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Figure 11:
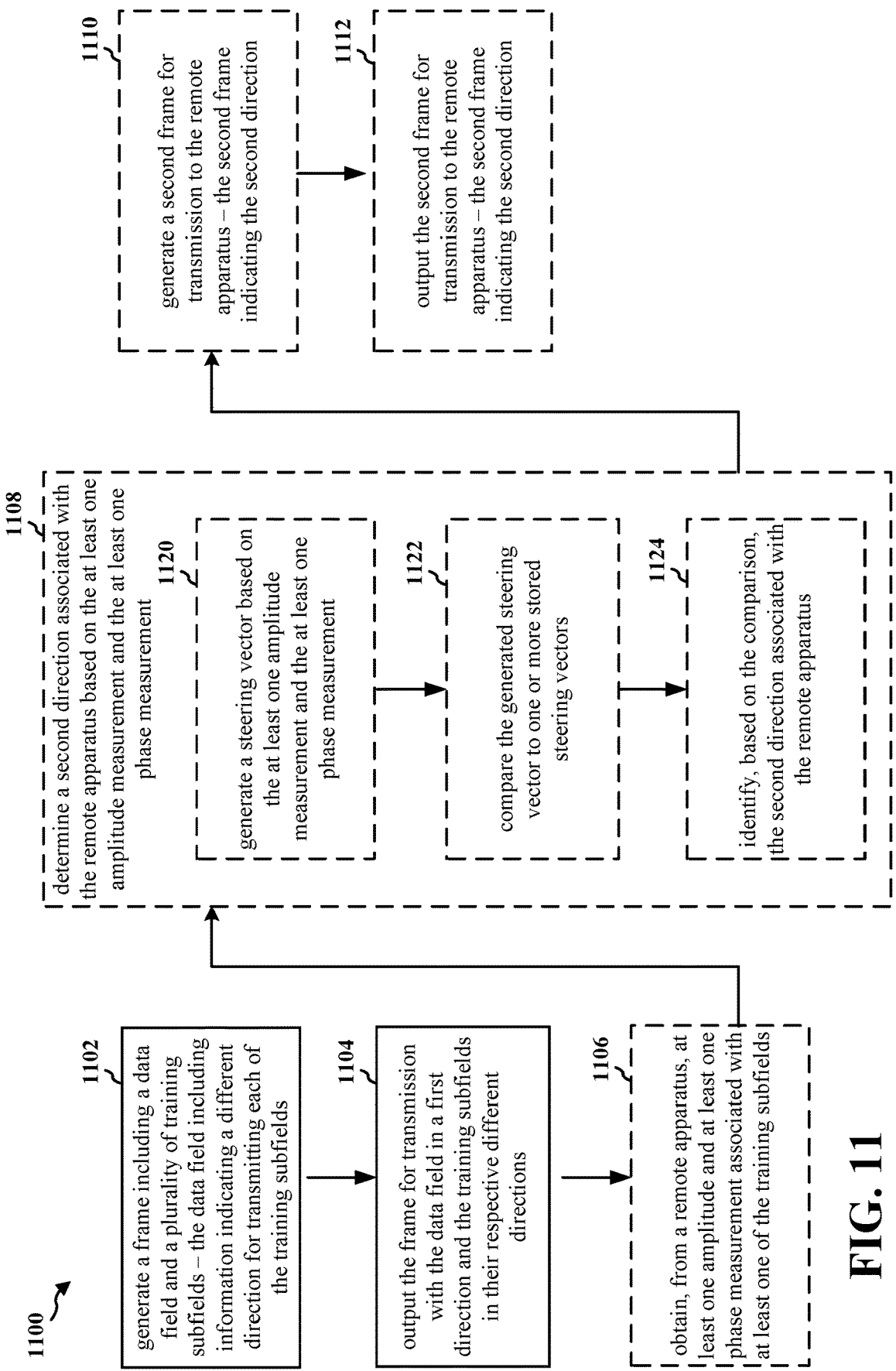
FIG. 11 is a flowchart of an example method of transmitting data on an extra data channel for wireless communication, in accordance with certain aspects of the present disclosure.

FIG. 11 is a flowchart of an example method 1100 of transmitting a data field in a first direction and a plurality of training subfields in different directions, for example, in order to improve angular resolution. The method 1100 may be performed using an apparatus (e.g., the AP 110, the first AP 810, the second AP 840, the training component 1024, or the wireless device 1002, for example). Although the method 1100 is described below with respect to the elements of wireless device 1002 of FIG. 10, other components may be used to implement one or more of the steps described herein. Blocks denoted by dotted lines may represent optional operations.

At block 1102, an apparatus may generate a frame including a data field and a plurality of training subfields. In an aspect, the data field may include information indicating a different direction for transmitting each of the training subfields. For example, the apparatus may assign a different direction for transmitting each of the training subfields to each of the training subfields, and the apparatus may include information indicating each different direction assigned to each training subfield. In one aspect, the information indicates each different direction as a respective angular offset for each of the training subfields relative to a first direction in which the data field is to be transmitted. In another aspect, the information indicates a respective direction vector for each of the training subfields, and each direction vector may indicate an azimuthal angle and an elevation angle. In one aspect, the data field may include information indicating a location of the apparatus.

For example, referring to FIG. 8, the apparatus may correspond to the first AP 810. The first AP 810 may generate the frame 700' to include information a data field 706' that indicates a different direction for transmitting each of the training subfields, including the different direction 816 for transmitting the training subfield 720a'. In one aspect, the information indicates each different direction as a respective angular offset for each of the training subfields (e.g., training subfield 720a') relative to a first direction 814 in which the data field 706' is to be transmitted. In another aspect, the information indicates a respective direction vector for each of the training subfields (including the training subfield 720a'), and each direction vector may indicate an azimuthal angle and an elevation angle. In one aspect, the data field may include information indicating a location of the first AP 810.

At block 1104, the apparatus may output the frame for transmission with the data field in a first direction and the training subfields in their respective different directions. In one aspect, the apparatus is configured to output the frame for transmission with the data field in the first direction to be transmitting using a first beam width and each of the training subfields to be transmitting using a second beam width that is equal to or less than the first beam width. For example, referring to FIG. 8, the first AP 810 may output the frame 700' for transmission with the data field 706' in a first direction 814 and the training subfields in their respective different directions, including the training subfield 720a' in the different direction 816. In one aspect, the first AP 810 is configured to output the frame 700' for transmission with the data field 706' in the first direction 814 to be transmitting using a first beam width and each of the training subfields (including the training subfield 720a') to be transmitting using a second beam width that is equal to or less than the first beam width.

At block 1106, the apparatus may obtain, from a remote apparatus (e.g., STA), at least one phase measurement and at least one amplitude measurement associated with at least one of the training subfields. For example, referring to FIG. 8, the first AP 810 may obtain (e.g., receive), from the STA 805, the frame 860 that includes at least one phase measurement and at least one amplitude measurement associated with the training subfield 720a'.

At block 1108, the apparatus may determine a second direction associated with the remote apparatus based on the at least one phase measurement and the at least one amplitude measurement. In an aspect, the apparatus may determine the second direction further based on the first direction in which the data field is transmitted. For example, referring to FIG. 8, the first AP 810 may determine a second direction (e.g., the different direction 816) associated with the STA 805 based on the at least one phase measurement and the at least one amplitude measurement included in the frame 860. In an aspect, the first AP 810 may determine the second direction further based on the first direction 814.

Block 1108 may include one or more of block 1120, 1122, and/or block 1124. At block 1120, the apparatus may generate a steering vector based on the at least one phase measurement and the at least one amplitude measurement. For example, referring to FIG. 8, the first AP 810 may generate (e.g., calculate) a steering vector based on the at least one phase measurement and the at least one amplitude measurement received in the frame 860.

At block 1122, the apparatus may compare the generate steering vector to one or more stored steering vectors. For example, referring to FIG. 8, the first AP 810 may compare the generated steering vector to one or more stored steering vectors, which indicate different directions for transmitting beams by antenna elements (e.g., during the sector sweep 812) of the first AP 810.

At block 1124, the apparatus may identify, based on the comparison, the second direction associated with the remote apparatus. For example, the apparatus may identify a direction that corresponds to a stored steering vector that approximately matches the generated steering vector. For example, referring to FIG. 8, the first AP 810 may compare the generated steering vector to one or more stored steering vectors.

At block 1110, the apparatus may generate a second frame that includes the second direction. For example, referring to FIG. 8, the first AP 810 may generate a second frame for transmission to the STA 805, and the second frame may indicate the second direction (e.g., the different direction 816).

At block 1112, the apparatus may output the second frame for transmission to the remote apparatus, and the second frame may indicate the second direction. For example, referring to FIG. 8, the first AP 810 may output a second frame for transmission to the STA 805, and the second frame may indicate the second direction (e.g., the different direction 816).

Figure 12:
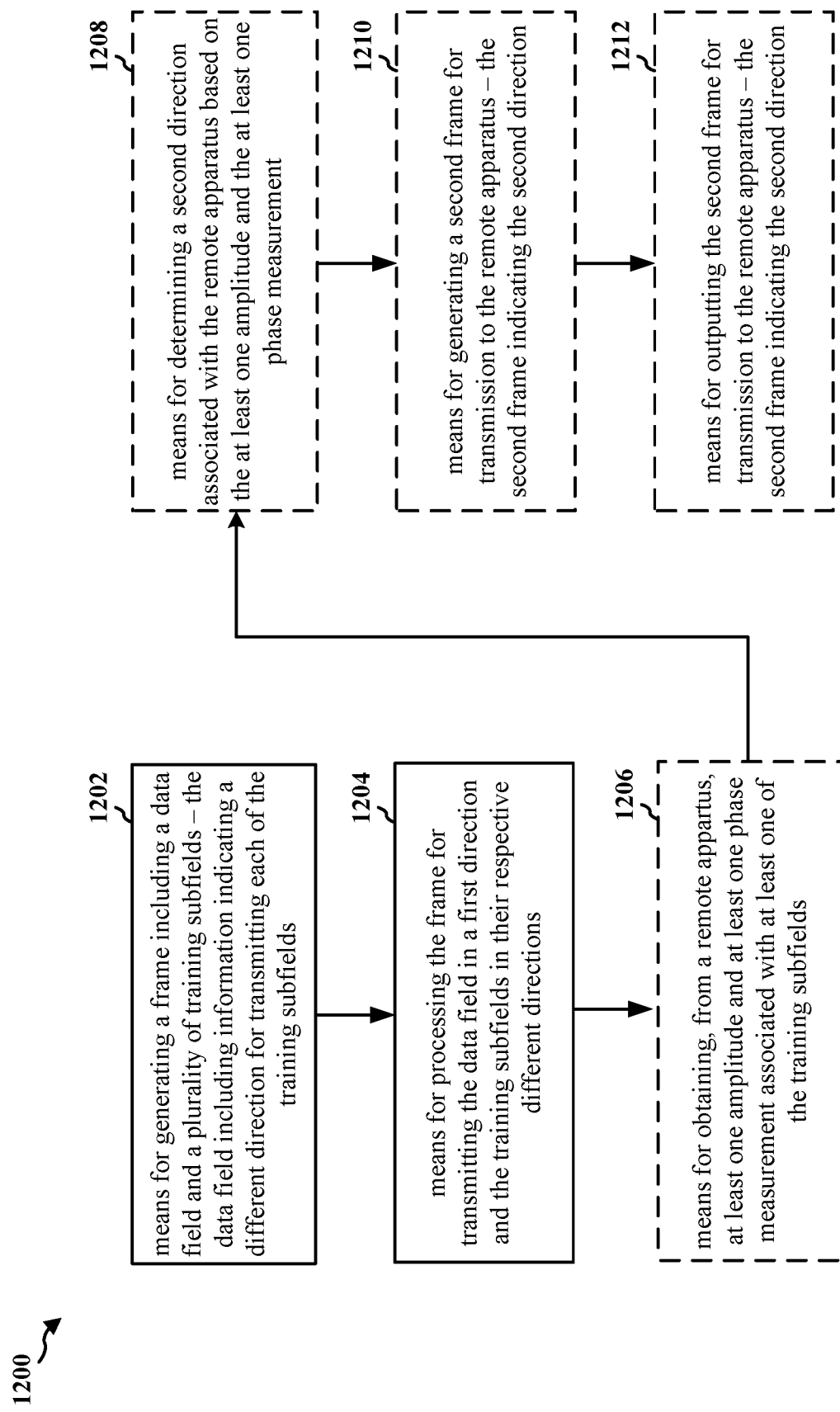
FIG. 12 illustrates exemplary means capable of performing the operations set forth in FIG. 11.

FIG. 12 illustrates exemplary means 1200 capable of performing the operations set forth in FIG. 11. The exemplary means 1200 may include means 1202 for generating a frame including a data field and a plurality of training subfields—the data field including information indicating a different direction for transmitting each of the training subfields. Means 1202 may include, for example, controller 230, controllers 280, digital signal processor 1020, and/or processor 1004 shown in FIG. 2 and FIG. 10. The exemplary means 1200 may include means 1204 for outputting the frame for transmission with the data field in a first direction and the training subfields in their respective different directions. Means 1204 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 1016, transmitter 1010, digital signal processor 1020, and/or processor 1004 shown in FIG. 2 and FIG. 10. The exemplary means 1200 may include means 1206 for obtaining, from a remote apparatus, at least one phase measurement and at least one amplitude measurement associated with at least one of the training subfields. Means 1206 may include, for example, an interface (e.g., of a processor), antennas 224, antennas 252, receiver units 222, receiver units 254, RX spatial processor 240, RX spatial processors 260, RX data processor 242, RX data processors 270, controller 230, controllers 280, antennas 1016, receiver 1012, digital signal processor 1020, and/or processor 1004 shown in FIG. 2 and FIG. 10. The exemplary means 1200 may include means 1208 for determining a second direction associated with the remote apparatus based on the at least one phase measurement and the at least one amplitude measurement. Means 1208 may include, for example, controller 230, controllers 280, digital signal processor 1020, and/or processor 1004 shown in FIG. 2 and FIG. 10. The exemplary means 1200 may include means 1210 for generating a second frame for transmission to the remote apparatus, the second frame indicating the second direction.

Means 1210 may include, for example, controller 230, controllers 280, digital signal processor 1020, and/or processor 1004 shown in FIG. 2 and FIG. 10. The exemplary means 1200 may include means 1212 for outputting the second frame for transmission to the remote apparatus, the second frame indicating the second direction. Means 1212 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 1016, transmitter 1010, digital signal processor 1020, and/or processor 1004 shown in FIG. 2 and FIG. 10.

Figure 13:
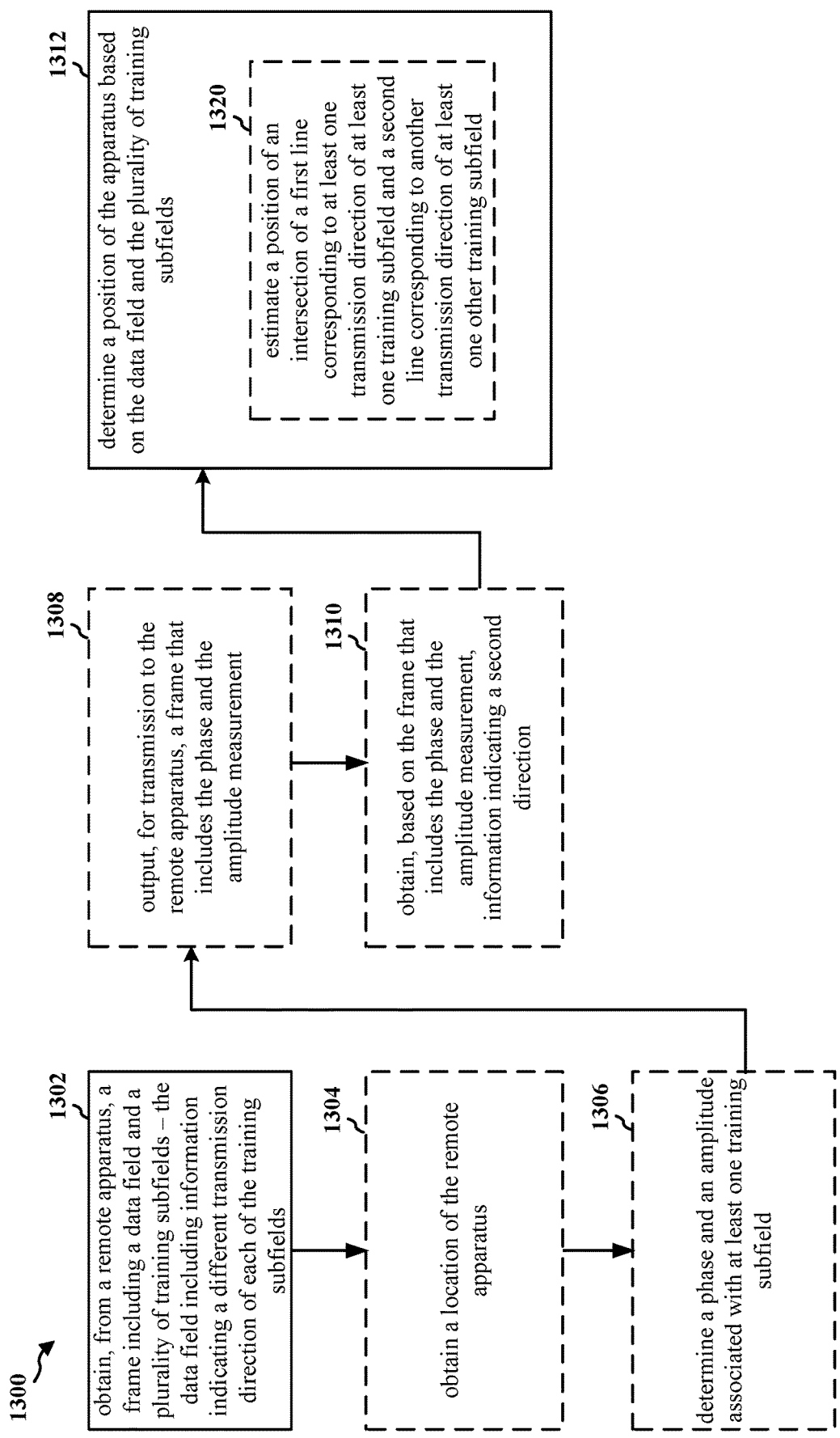
FIG. 13 is a flowchart of an example method of receiving data on an extra data channel for wireless communication, in accordance with certain aspects of the present disclosure.

FIG. 13 is a flowchart of an example method 1300 of determining a position based on an AOD approach. The method 1300 may be performed using an apparatus (e.g., the UT 120, the position component 1026, or the STA 805, for example). Although the method 1300 is described below with respect to the elements of STA 805 of FIG. 8, other components may be used to implement one or more of the steps described herein. Blocks denoted by dotted lines may represent optional operations.

At block 1302, an apparatus may obtain, from a remote apparatus (e.g., AP), a frame including a data field and a plurality of training subfields. In an aspect, the data field includes information indicating a different transmission direction of each of the training subfields. In one aspect, the information indicates, for each of the training subfields, a respective angular offset relative to a first direction associated with the data field. In another aspect, the information indicates a respective direction vector for each of the training subfields, and each direction vector may indicate an azimuthal angle and an elevation angle. For example, referring to FIG. 8, the apparatus may correspond to the STA 805. The STA 805 may obtain (e.g., receive), from the first AP 810, the frame 700' that includes the data field 706' and a plurality of training subfields, including the training subfield 720a'. The data field 706' may include information indicating a different transmission direction of each of the training subfields, including the different direction 816 of the training subfield 720a'. In one aspect, the information indicates, for each of the training subfields, a respective angular offset relative to a first direction associated with the data field. In another aspect, the information indicates a respective direction vector for each of the training subfields, each direction vector indicating an azimuthal angle and an elevation angle.

At block 1304, the apparatus may obtain a location of the remote apparatus (e.g., AP). In an aspect, the apparatus may obtain the location of the remote apparatus from the data field of the frame. For example, referring to FIG. 8, the STA 805 may obtain a location of the first AP 810. For example, the data field 706' of the frame 700' may include information indicating the location of the first AP 810.

At block 1306, the apparatus may determine a phase measurement and an amplitude measurement associated with at least one training subfield. For example, the apparatus may measure an amplitude measurement of at least one training subfield and/or the apparatus may measure a phase measurement of at least one training subfield. In one aspect, the apparatus may measure a difference (e.g., a phase difference) of the at least one training subfield and another training subfield. For example, referring to FIG. 8, the STA 805 may measure a phase measurement and an amplitude measurement associated with the training subfield 720a'. In an aspect, the STA 805 may determine a difference (e.g., a phase difference) between the training subfield 720a' and another training subfield 720c'.

At block 1308, the apparatus may output, for transmission to the remote apparatus (e.g., the AP), a frame that includes the phase measurement and the amplitude measurement. For example, referring to FIG. 8, the STA 805 may output, for transmission to the first AP 810, the frame 860 that includes the phase measurement and the amplitude measurement.

At block 1310, the apparatus may obtain, based on the frame that includes the phase measurement and the amplitude measurement, information indicating a second direction. For example, referring to FIG. 8, the STA 805 may obtain (e.g., receive), based on the frame 860 that includes the phase measurement and the amplitude measurement, information indicating a second direction. The STA 805 may obtain the information indicating the second direction from the first AP 810.

At block 1312, the apparatus may determine (e.g., estimate) a position of the apparatus based on the data field and the plurality of training subfields. In one aspect, the apparatus may further determine the position of the apparatus based on the location of the remote apparatus. In still a further aspect, the apparatus may determine the position of the apparatus based on the phase measurement and the amplitude measurement. In an aspect, the apparatus may determine the position further based on the first direction in which the data field is transmitted. In yet another aspect, the apparatus may determine the position of the apparatus based on the second direction obtained from the frame including the phase measurement and the amplitude measurement. For example, referring to FIG. 8, the STA 805 may determine a position of the STA 805 based on the data field 706' and the plurality of training subfields, including the training subfield 720a'. In one aspect, the STA 805 may further determine the position of the STA 805 based on the location of the first AP 810. In still a further aspect, the STA 805 may determine the position of the STA 805 based on the phase measurement and the amplitude measurement. In an aspect, the STA 805 may determine the position based on the first direction 814. In yet another aspect, the STA 805 may determine the position of the STA 805 based on the second direction obtained from the frame 860 including the phase measurement and the amplitude measurement.

In an aspect, the block 1312 may include block 1320. At block 1320, the apparatus may estimate a position of the apparatus as an intersection of a first line corresponding to at least one transmission direction of at least one training subfield and a second line corresponding to another transmission direction of at least one other training subfield. In one aspect, the at least one transmission direction of the at least one training subfield may be a transmission direction of the at least one training subfield as indicated by the data field. In one aspect, the at least one transmission direction of the at least one training subfield may be the second direction obtained based on the frame that includes the phase measurement and the amplitude measurement. In still a further aspect, the at least one transmission direction may be a transmission direction determined by the apparatus based on the phase measurement and the amplitude measurement. For example, referring to FIG. 8, the STA 805 may estimate a position of the STA 805 as the intersection 850 of the first line corresponding to the different transmission direction 816 of the first training subfield 720a' (e.g., between the STA 805 and the first AP 810) and the second line corresponding to the different transmission direction 846 of the second training subfield 720b'' (e.g., between the STA 805 and the second AP 840). In one aspect, the different transmission direction 816 of the training subfield 720a' may a transmission direction of the training subfield 720a' as indicated by the data field 706'. In one aspect, the transmission direction of the training subfield 720a' may be the second direction obtained based on the frame 860 that includes the phase measurement and the amplitude measurement. In still a further aspect, the transmission direction may be a transmission direction determined by the STA 805 based on the phase measurement and the amplitude measurement.

Figure 14:
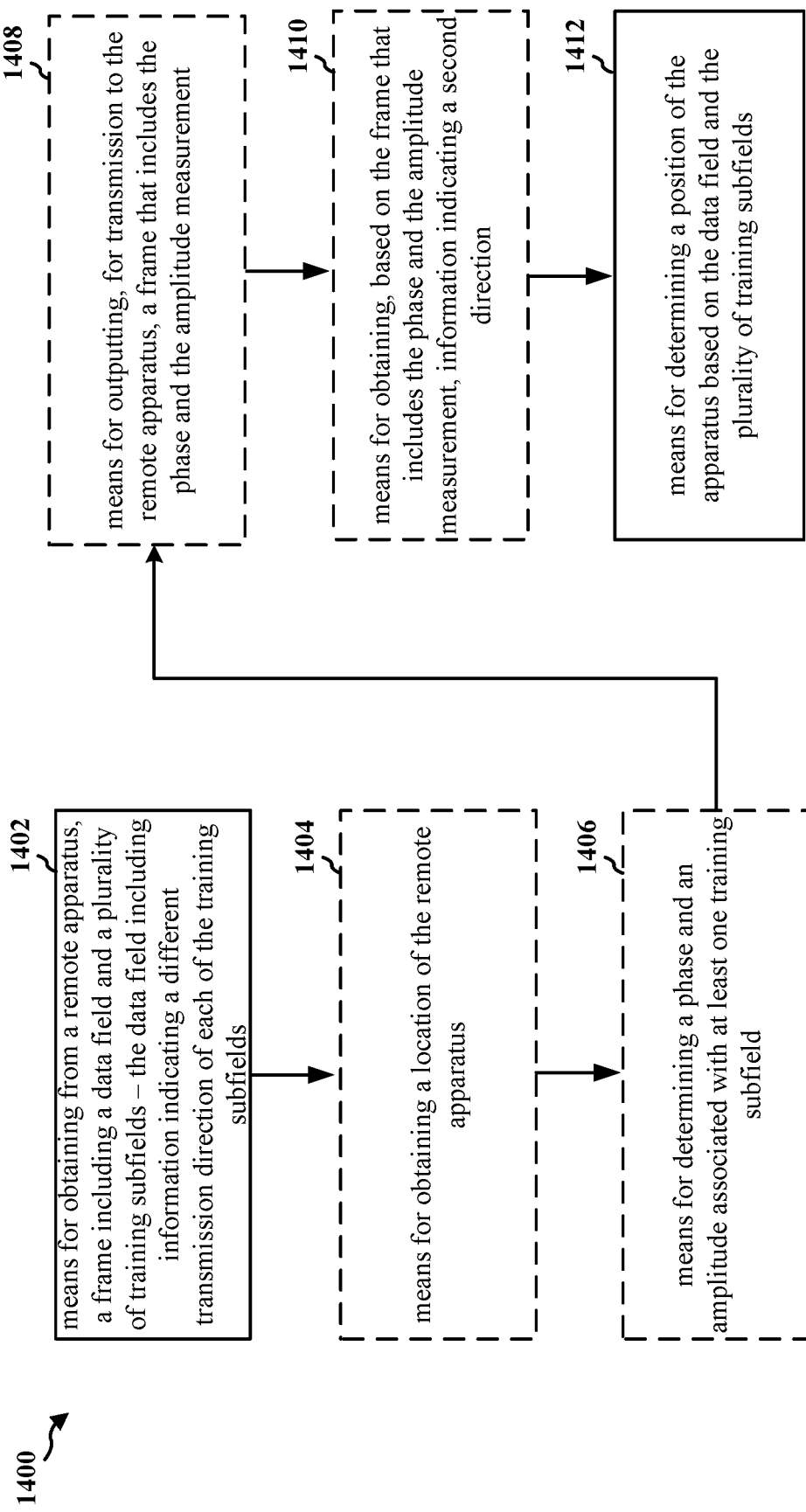
FIG. 14 illustrates exemplary means capable of performing the operations set forth in FIG. 13.

FIG. 14 illustrates exemplary means 1400 capable of performing the operations set forth in FIG. 13. The exemplary means 1400 may include means 1402 for obtaining from a remote apparatus, a frame including a data field and a plurality of training subfields—the data field including information indicating a different transmission direction of each of the training subfields. Means 1402 may include, for example, antennas 224, antennas 252, receiver units 222, receiver units 254, RX spatial processor 240, RX spatial processors 260, RX data processor 242, RX data processors 270, controller 230, controllers 280, antennas 1016, receiver 1012, digital signal processor 1020, and/or processor 1004 shown in FIG. 2 and FIG. 10. The exemplary means 1400 may include means 1404 for obtaining a location of the remote apparatus. The means 1404 may include, for example, antennas 224, antennas 252, receiver units 222, receiver units 254, RX spatial processor 240, RX spatial processors 260, RX data processor 242, RX data processors 270, controller 230, controllers 280, antennas 1016, receiver 1012, digital signal processor 1020, and/or processor 1004 shown in FIG. 2 and FIG. 10. The exemplary means 1400 may include means 1406 for determining a phase measurement and an amplitude measurement associated with at least one training subfield. Means 1406 may include, for example, controller 230, controllers 280, digital signal processor 1020, and/or processor 1004 shown in FIG. 2 and FIG. 10. The exemplary means 1400 may include means 1408 for outputting, for transmission to the remote apparatus, a frame that includes the phase measurement and the amplitude measurement. Means 1408 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 1016, transmitter 1010, digital signal processor 1020, and/or processor 1004 shown in FIG. 2 and FIG. 10. The exemplary means 1400 may include means 1410 for obtaining, based on the frame that includes the phase measurement and the amplitude measurement, information indicating a second direction. Means 1410 may include, for example, antennas 224, antennas 252, receiver units 222, receiver units 254, RX spatial processor 240, RX spatial processors 260, RX data processor 242, RX data processors 270, controller 230, controllers 280, antennas 1016, receiver 1012, digital signal processor 1020, and/or processor 1004 shown in FIG. 2 and FIG. 10. The exemplary means 1400 may include means 1412 for determining a position of the apparatus based on the data field and the plurality of training subfields. Means 1412 may include, for example, controller 230, controllers 280, digital signal processor 1020, and/or processor 1004 shown in FIG. 2 and FIG. 10.

The various operations of methods described above may be performed by any suitable means capable of performing the operations. The means may include various hardware and/or software component(s) and/or module(s), including, but not limited to a circuit, an application specific integrated circuit (ASIC), or processor. Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-b, a-c, b-c, a-b-c, a-a, b-b, and c-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, the apparatus comprising:
   a processing system configured to generate a frame including a data field and a plurality of training subfields, wherein the data field includes information indicating a different direction for transmitting each of the training subfields; and
   an interface configured to output the frame for transmission with the data field to be transmitted in a first direction and the training subfields to be transmitted in their respective different directions, wherein the transmission of the training subfields of the frame in their respective different directions is to improve accuracy of position determination by a remote apparatus.

2. The apparatus of claim 1, wherein the information indicates a respective angular offset relative to the first direction for each of the training subfields.

3. The apparatus of claim 1, wherein the information indicates a respective direction vector for each of the training subfields, each direction vector indicating an azimuthal angle and an elevation angle.

4. The apparatus of claim 1, wherein the interface is further configured to output the frame for transmission with the data field to be transmitting using a first beam width and each of the training subfields to be transmitting using a beam width equal to or less than the first beam width.

5. The apparatus of claim 1, wherein:
   the interface is further configured to obtain, from the remote apparatus, at least one amplitude measurement and at least one phase measurement associated with at least one of the training subfields;
   the processing system is further configured to determine a second direction associated with the remote apparatus based on the at least one phase measurement and the at least one amplitude measurement, and to generate a second frame that includes the second direction; and
   the interface is configured to output the second frame for transmission.

6. The apparatus of claim 5, wherein the processing system is further configured to determine the second direction by:
   generating a steering vector based on the at least one phase measurement and the at least one amplitude measurement;
   comparing the generated steering vector to one or more stored steering vectors; and
   identifying, based on the comparison, the second direction associated with the remote apparatus.

7. The apparatus of claim 5, wherein the processing system is configured to determine the second direction further based on the first direction.

8. The apparatus of claim 1, wherein:
the processing system is further configured to include, in the data field, information indicating a location of the apparatus.

9. An apparatus for wireless communication, the apparatus comprising:
an interface configured to obtain, from a remote apparatus, a frame including a data field and a plurality of training subfields, wherein the data field includes information indicating a different transmission direction of each of the training subfields; and
a processing system configured to determine a position of the apparatus based on the data field and the plurality of training subfields, wherein the different transmission direction of each of the training subfields of the frame is to improve accuracy of the determination of the position of the apparatus.

10. The apparatus of claim 9, wherein the information indicates, for each of the training subfields, a respective angular offset relative to a first transmission direction associated with the data field.

11. The apparatus of claim 9, wherein the information indicates a respective direction vector for each of the training subfields, each direction vector indicating an azimuthal angle and an elevation angle.

12. The apparatus of claim 9, wherein:
the interface is further configured to obtain a location of the remote apparatus, and
the processing system is further configured to determine the position of the apparatus further based on the location of the remote apparatus.

13. The apparatus of claim 12, wherein the frame further indicates the location of the remote apparatus.

14. The apparatus of claim 9, wherein the processing system is configured to determine the position of the apparatus based on at least one transmission direction of at least one training subfield and another transmission direction of at least one other training subfield.

15. The apparatus of claim 14, wherein the at least one other training subfield is included in another frame obtained from a second remote apparatus.

16. The apparatus of claim 9, wherein:
the processing system is further configured to determine a phase measurement and an amplitude measurement associated with at least one training subfield,
the interface is configured to:
output, for transmission to the remote apparatus, a frame that includes the phase measurement and the amplitude measurement, and
obtain, based on the frame that includes the phase measurement and the amplitude measurement, information indicating a second direction, and
the processing system is further configured to determine the position based on the second direction.

17. The apparatus of claim 9, wherein the processing system is further configured to determine a phase measurement and an amplitude measurement associated with at least one training subfield and to determine the position of the apparatus based on the phase measurement and the amplitude measurement.

18. The apparatus of claim 17, wherein the processing system is configured to determine the position further based on the first direction.

19. The apparatus of claim 9, further comprising an at least one antenna via which the frame is obtained by the interface, wherein the apparatus is configured as a wireless node.

20. A wireless node for wireless communication, comprising:
a processing system configured to:
generate a frame including a data field and a plurality of training subfields, wherein the data field includes information indicating a different direction for transmitting each of the training subfields; and
a transmitter configured to transmit the data field in a first direction and the training subfields in their respective different directions, wherein the transmission of the training subfields of the frame in their respective different directions is to improve accuracy of position determination by a remote apparatus.

* * * * *